United States Patent
Zimmerman et al.

(10) Patent No.: US 11,461,419 B2
(45) Date of Patent: Oct. 4, 2022

(54) DISCOVERING ALTERNATE ONLINE SERVICE PROVIDERS

(71) Applicant: GOOGLE LLC, Mountain View, CA (US)

(72) Inventors: Jared Zimmerman, Mountain View, CA (US); Heather Campbell, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 26 days.

(21) Appl. No.: 16/946,851

(22) Filed: Jul. 9, 2020

(65) Prior Publication Data
US 2022/0012293 A1     Jan. 13, 2022

(51) Int. Cl.
| | | |
|---|---|---|
| *G06F 16/9538* | (2019.01) | |
| *G06F 16/9535* | (2019.01) | |
| *G06F 16/954* | (2019.01) | |

(52) U.S. Cl.
CPC ........ *G06F 16/9535* (2019.01); *G06F 16/954* (2019.01); *G06F 16/9538* (2019.01)

(58) Field of Classification Search
CPC . G06F 16/9535; G06F 16/9538; G06F 16/954
See application file for complete search history.

(56) References Cited

U.S. PATENT DOCUMENTS

| | | |
|---|---|---|
| 6,295,528 B1 | 9/2001 | Marcus et al. |
| 6,904,433 B2 | 6/2005 | Kapitskaia et al. |
| 9,720,672 B2 * | 8/2017 | Lipton ............. G06F 9/445 |
| 10,019,484 B2 | 7/2018 | Fink et al. |
| 10,289,618 B2 | 5/2019 | Fink et al. |
| 2001/0032205 A1 | 10/2001 | Kubaitis et al. |
| 2005/0065967 A1 | 3/2005 | Schuetze et al. |
| 2005/0114306 A1 | 5/2005 | Shu et al. |
| 2006/0015483 A1 | 1/2006 | Gownder et al. |
| 2006/0224570 A1 | 10/2006 | Quiroga et al. |
| 2008/0208567 A1 | 8/2008 | Brockett et al. |
| 2009/0019020 A1 | 1/2009 | Dhillon et al. |
| 2009/0027392 A1 | 1/2009 | Jadhav et al. |

(Continued)

FOREIGN PATENT DOCUMENTS

| | | |
|---|---|---|
| CN | 101231636 A | 7/2008 |
| CN | 101578862 A | 11/2009 |
| CN | 103034704 A | 4/2013 |

OTHER PUBLICATIONS

"Interactive Snippets", retrieved from https://github.com/bobuk/islands/blob/master/interactive-answers-eng.md, May 29, 2013, 7 pages.

(Continued)

*Primary Examiner* — Kris E Mackes
(74) *Attorney, Agent, or Firm* — Brake Hughes Bellermann LLP

(57) ABSTRACT

Systems and methods are described that include determining an intent from an intent library that matches a received query, identifying, based on the intent, at least one mini-app from a first provider and at least one mini-app from a second provider, ranking the identified mini-apps, and triggering rendering of search results, the search results including at least a first ranked mini-app in an expanded state and the remaining ranked mini-apps in a collapsed state.

19 Claims, 13 Drawing Sheets

(56) References Cited

U.S. PATENT DOCUMENTS

| | | |
|---|---|---|
| 2010/0070448 A1 | 3/2010 | Omoigui et al. |
| 2010/0306678 A1 | 12/2010 | Kulas et al. |
| 2011/0083167 A1 | 4/2011 | Carpenter et al. |
| 2012/0174236 A1 | 7/2012 | Goodwin et al. |
| 2012/0284247 A1* | 11/2012 | Jiang .................. G06F 16/9535 707/706 |
| 2012/0290620 A1 | 11/2012 | Guan et al. |
| 2013/0012179 A1 | 1/2013 | Watkins et al. |
| 2013/0024448 A1 | 1/2013 | Herbrich et al. |
| 2013/0198726 A1 | 8/2013 | Smith et al. |
| 2013/0238609 A1 | 9/2013 | Marantz et al. |
| 2013/0276136 A1 | 10/2013 | Goodwin et al. |
| 2013/0290289 A1 | 10/2013 | Yu et al. |
| 2014/0006370 A1 | 1/2014 | Keshri et al. |
| 2014/0040226 A1* | 2/2014 | Sadhukha ............... G06F 9/445 707/706 |
| 2014/0101739 A1 | 4/2014 | Li et al. |
| 2015/0026212 A1 | 1/2015 | Fink et al. |
| 2016/0188742 A1* | 6/2016 | Ingvoldstad ........ G06F 16/9562 707/722 |
| 2017/0193107 A1* | 7/2017 | Imbruce .............. G06F 16/9535 |

OTHER PUBLICATIONS

PCT/US2014/046638 , "International Search Report and Written Opinion Received", dated Nov. 4, 2014, 11 Pages.

"Sandbox (computer security)", Wikipedia, the free encyclopedia, XP055149170, Retrieved from the Internet: URL:http://en.wikipedia.org/w/index.php?title=Sandbox_%28computer_security%29&oldid=559028603[retrieved on Oct. 27, 2014], Jul. 9, 2013, pp. 1-2.

* cited by examiner

DISCOVERING ALTERNATE ONLINE SERVICE PROVIDERS

BACKGROUND

In the context of computer-based consumption of media and other content, it is becoming increasingly common to provide a user of a search engine with links to data based on a particular search intent. The search intent may represent a reason for why a user entered a particular search query. For example, the search intent may describe an activity that the user wishes to carry out. The scope of such search intents may vary widely amongst users and entered search queries.

SUMMARY

Implementations described herein use intent to generate a variety of search results associated with a number of service providers. The systems and techniques described herein can use the intent to discover user-associated service providers (e.g., providers that the user has accessed in a prior browsing session) and to find additional alternate service providers for similar intent-based queries. The discovered service providers may offer a number of online task-specific services (e.g., via a mini-app) that may be provided in a single user interface.

In general, the systems and techniques described herein may match a received search query with intents from one or more intent libraries. The intent libraries may be associated with multiple service providers. The matched intents may be used to generate a summary level search result list with which the user can interact. The summary level search result list may, for example, include a list of mini-apps. Mini-apps may provide interactive app-like experiences (e.g., functionality) within a web browser, for example, to help users find specific information or perform a specific function online. The user may use a list of provided mini-apps to compare how each provider offers content for user needs and/or expectations and to access app functionality via the search result page without having to install an app.

The systems and techniques described herein can select service providers that provide such mini-apps based on intent (e.g., criteria, keywords, etc.) associated with a search entered by a user. The intent may also be used to indicate and/or trigger a particular workflow of related tasks that a user may carry out using a number of mini-apps provided as search results.

As used herein, a mini-app represents an app provided within a search result page of a web browser or other user interface (UI). Mini-apps may provide interactive and/or informational task-based interfaces configured to aid a user in a singular task or goal. Such mini-apps are not installed onto a computing device, but are instead provided with functionality on the search result page. For example, the mini-apps described herein provide app functionality from the UI of a search page operating in a web browser. In addition, a number of service providers may surface the mini-apps to be presented on a search page such that a user may select a particular app based on brand, function, and/or convenience, etc.

According to certain aspects of the disclosure, a method includes determining an intent from an intent library that matches a received query and identifying at least one mini-app from a first provider and at least one mini-app from a second provider. The identifying is based on the determined intent. The method may further include ranking the identified mini-apps and triggering rendering of search results. The search results include at least a first ranked mini-app in an expanded state and the remaining ranked mini-apps in a collapsed state.

These and other aspects can include one or more of the following, alone or in combination. For example, the ranking of the identified mini-apps may be based at least in part on a determined affiliation between a user providing the query and the first provider or the second provider. In some implementations, the determining of the affiliation of the user to the first provider or the second provider includes determining that the respective provider is provided as a search term in the query. In some implementations, determining the intent includes matching at least one keyword of the query to at least one intent in the intent library. In some implementations, a second ranked mini-app is selected based on a determined lack of relationship between a user providing the query and the first provider or the second provider.

In some implementations, the method further includes receiving input in the first ranked mini-app and receiving selection upon another mini-app within the search results. The received selection may trigger a collapsing of the first ranked mini-app, an expansion of the selected other mini-app, and populating of the selected other mini-app with the received input from the first ranked mini-app mapped to at least one field in the selected other mini-app. In some implementations, triggering rendering of a view more control that when selected ranks and populates additional mini-apps that match the determined intent, the additional mini-apps being in a collapsed state.

According to certain aspects of the disclosure, a system includes at least one intent library, a repository of mini-app data, at least one processing device, and memory storing instructions that when executed cause the processing device to perform operations including determining an intent from the intent library that matches a received query, identifying based on the determined intent, and using the repository of mini-app data, at least one mini-app from a provider, identifying, using the repository of mini-app data, additional mini-apps from the provider, ranking the identified mini-apps, and triggering rendering of search results, the search results including a first ranked mini-app in an expanded state and the additional mini-apps in a collapsed state.

These and other aspects can include one or more of the following, alone or in combination. For example, the at least one mini-app is selected based on the intent and a determination that the provider is associated with a user entering the query. In some implementations, determining the association of the provider to the user includes determining that the provider is a search term in the query. In some implementations, determining the association of the provider to the user includes determining that the user is logged into a user account associated with the provider.

In some implementations, the operations further comprise triggering rendering of a view more control that when selected ranks and populates additional mini-apps that match the determined intent. The additional mini-apps may be in a collapsed state.

According to certain aspects of the disclosure, a non-transitory computer-readable medium comprising instructions stored thereon that, when executed by at least one processor, are configured to cause a computing system to at least determine an intent from an intent library that matches at least a portion of a received query and generate a workflow associated with the determined intent. The workflow may include an ordered task list and a plurality of mini-apps, provided by service providers and selected from a repository of mini-apps. The instructions may further include ranking the selected plurality of mini-apps according to the ordered task list and triggering rendering of search results, the search results including at least a first ranked mini-app in an expanded state and a remaining plurality of the mini-apps in a collapsed state.

These and other aspects can include one or more of the following, alone or in combination. For example, the instructions may be further configured to cause the computing system to generate and trigger rendering of a library page providing at least a portion of the plurality of mini-apps in an expanded state in response to receiving a view all request. In some implementations, the plurality of mini-apps are selected based on predefined login credentials associated with a user entering the query. In some implementations, the ordered task list is ordered based at least in part on stored aggregated user data associated with two or more of the plurality of mini-apps. In some implementations, generating the workflow associated with the determined intent includes selecting the plurality of mini-apps based at least in part on predicting at least two sequential tasks for the ordered task list.

In some implementations, generating the workflow associated with the determined intent includes selecting the plurality of mini-apps based at least in part on determining which mini-apps in the repository of mini-apps provide a service corresponding to another of the plurality of mini-apps in the repository.

In some implementations, the instructions further comprise triggering rendering of a view more control that when selected ranks and populates additional mini-apps for the workflow that match the determined intent where the additional mini-apps are in a collapsed state. In some implementations, at least a portion of the ranked plurality of mini-apps are selected based on a determined lack of relationship between a user providing the query and the respective service provider of the respective ranked mini-app.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

The use of similar or identical reference numbers in the various drawings is intended to indicate the presence of a similar or identical element or feature.

DETAILED DESCRIPTION

This document describes example systems and methods for discovering and providing app-based search results that are responsive to intent queries and served by any number of service providers. The systems and methods described herein can combine the search results into executable and/or informational app-like content in a UI configured with interactive controls and features that may be used inline with the displayed search results. In operation of the systems and techniques described herein, an intent may be determined and fulfilled by matching one or more intents associated with any number of service provider-based apps (e.g., mini-apps) to the determined intent associated with a received search query).

The implementations described herein may provide various search results (e.g., mini-apps, links, images, etc.) determined to match the intent. For example, the implementations described herein may provide such search results (e.g., mini-apps, links, images, etc.) in browsers, mobile browsers, or other particular user interfaces (e.g., home assistive devices, watches, wearable computers, etc.). For example, the search results may be provided based on matching a user-related intent to an intent fulfilled and/or otherwise associated with a particular service provider offering. In some implementations, the systems and techniques described herein can provide particular search results in a convenient UI that provides stacked mini-apps, accordion aligned mini-apps, minimized/maximized mini-apps, carousels of mini-apps, or other UI layout of search results based on the elements provided in each mini-app.

In some implementations, the systems and methods described herein can assess a user-entered search query and other user data to determine that a user typically has an affinity for a first service provider and can determine that one or more other service providers offer a similar functionality (e.g., in a mini-app) pertaining to the entered search query. In response to determining that other service providers offer similar functionality (e.g., and/or a similar mini-app), the systems described herein can retrieve both content (e.g., a mini-app) provided by the first service provider and content (e.g., mini-apps) provided by multiple other service providers. For example, if a user enters a search query "home interior modeler," the systems described herein can assess the user intent behind the search query as well as other available information provided by the user (e.g., session data, search history data, or other permission-accessible data) in order to provide app-like content (e.g., mini-apps) to the user that offer both home interior modeling functionality and interactive functionality within the browser search result page, for example. In some implementations, mini-apps can provide dynamic personalized content responsive to a search result.

Figure 1:
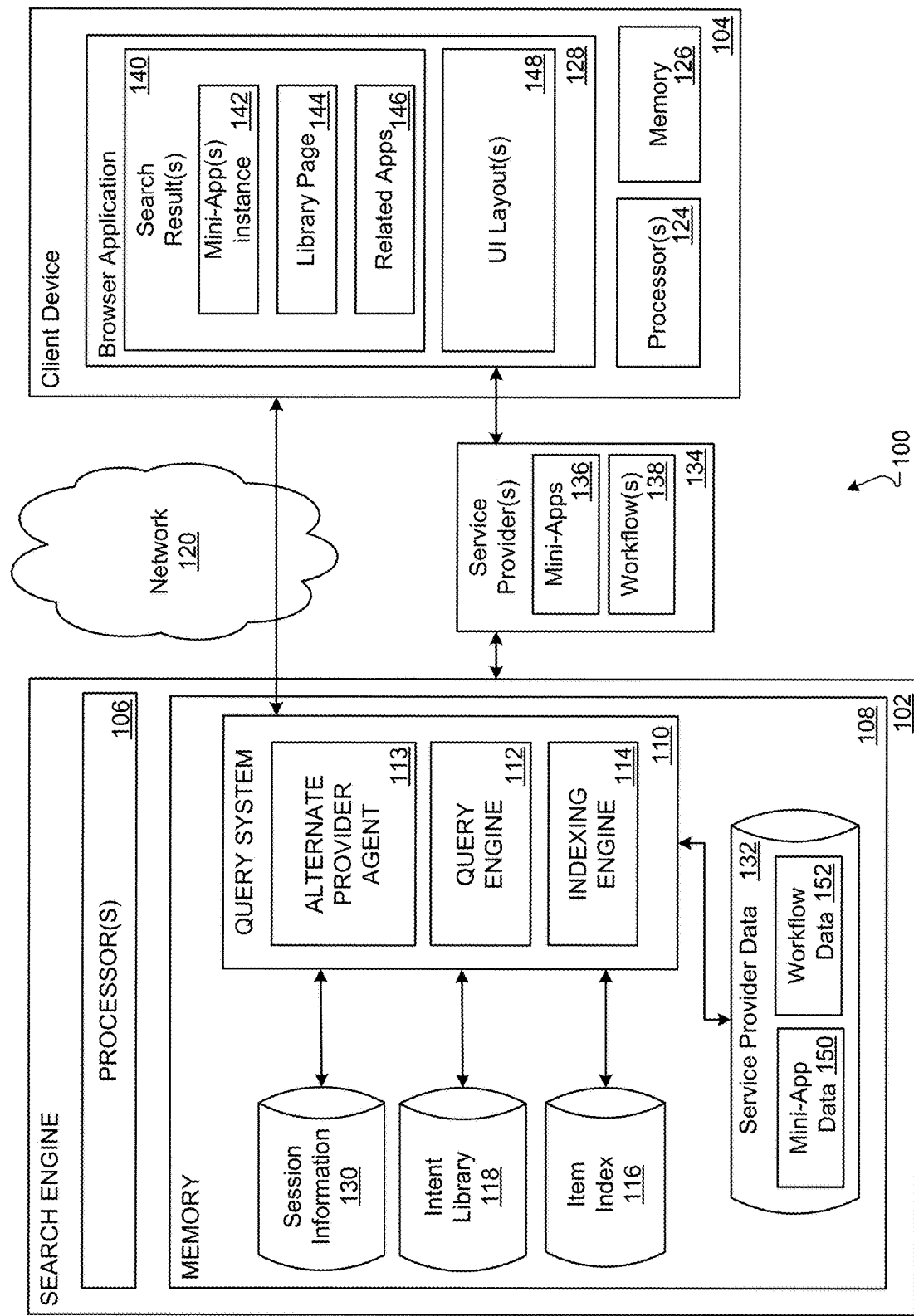
FIG. 1 an example system for discovering alternative online service providers, in accordance with some implementations.

FIG. 1 is a block diagram of a search service system 100 in accordance with an example implementation. The system 100 may be used to implement a search service that matches a user intent to multiple service providers to automatically provide app-based search results (e.g., mini-apps 136). The app-based search results may, in general, represent mini-apps that provide functionality within the search result page, for example, without having to click through to a new webpage for the app and without having to install the app. The functionality may be app-dependent and provided by the service provider associated with the app. In some implementations, the app-based search results may provide several apps on the search page, which may be ready to receive user-entered data. In some implementations, a first search result may provide and present available app interaction while the remaining apps on the page remain collapsed until a user selects or otherwise indicates intention to use one of the remaining apps (e.g., clicks, hovers, triggers search result expansion, etc.).

The depiction of system 100 in FIG. 1 is described as a search service for content accessible by the Internet that is configured to determine and use search query intent to provide app-based search results generated in response to a query. Other configurations and applications of the described technology may be used. For example, a search query intent associated with the user may be used in similar interactions with non-Internet sources, such as a company's internal documents or items in a corpus secured by a login (e.g., a members-only library). Implementations can be applied in any setting where a search service provides search results via a browser.

Figure 9:
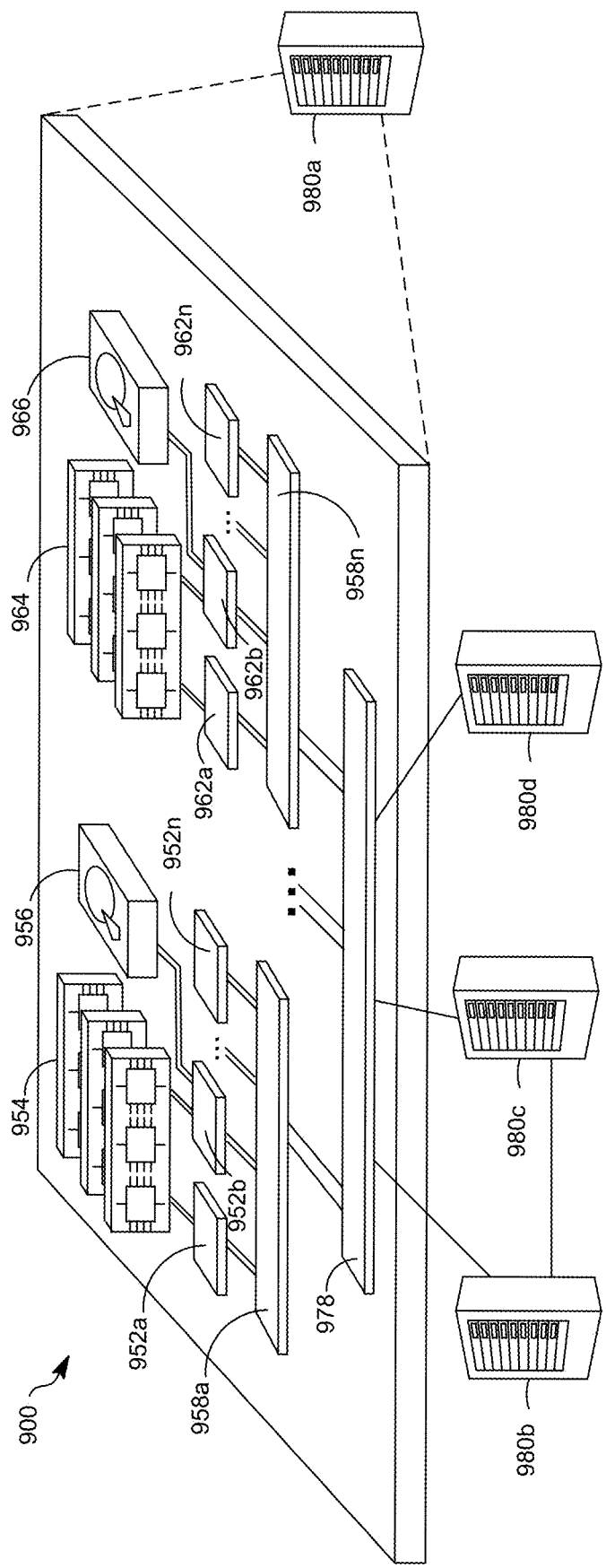
FIG. 9 shows an example of a distributed computer device that can be used to implement the described techniques.

The search service system 100 may include search engine 102. The search engine 102 may be computing devices that take the form of a number of different devices, for example a standard server, a group of such servers, or a rack server system. In some implementations, search engine 102 may be a single system sharing components such as processors and memories. In addition, search engine 102 may be implemented in a personal computer, for example a laptop computer. The search engine 102 may be an example of computer device 900, as depicted in FIG. 9. Search engine 102 may include one or more servers that receive queries from a requestor, such as client 104 and provide search results to the requestor.

The search engine 102 may include one or more processors 106 formed in a substrate, an operating system (not shown) and one or more computer memories 108. The computer memories 108 may represent any kind of memory (e.g., RAM, flash, cache, disk, tape, etc.). The memory 108 may represent multiple kinds of memory. In some implementations (not shown) the memory 108 may include external storage, e.g., memory physically remote from but accessible by search engine 102. The search engine 102 may include one or more modules or engines representing specially programmed software. For example, the search engine may include query system 110 that enables the search engine 102 to receive and respond to queries.

The query system 110 may itself include modules. For example, the query system 110 may include a query engine 112 and an indexing engine 114. The indexing engine 114 may be configured to update item index 116. For example, the indexing engine 114 may add items to item index 116, update items in index 116, and delete items from index 116. In some implementations, the indexing engine 114 may work with one or more crawlers. A crawler searches for items accessible via the Internet and returns content (including metadata) for the items. The indexing engine 114 may use the content and/or metadata to generate and update the index 116.

The query system 110 may also include a query engine 112. Query engine 112 may receive queries from requestors, such as client 104, analyze the query to determine how to search item index 116, and to initiate the search of the item index 116. A user may submit a query, e.g., a word, a phrase, a list of words, an image, a recording etc., to search engine 102. The search engine 102, specifically the query engine 112, uses one or more indices (item index 116) to identify items that are returned in response to the query. Items returned to the query engine 112 in response to the query may also be referred to as responsive items. The query engine 112 may generate a search result for some or all of the responsive items.

The query system 110 may additionally include an alternate provider agent 113. The alternate provider agent 113 is a module or lightweight application that is installed with user consent. The alternate provider agent 113 communicates with the query system 110. For example, the alternate provider agent 113 may exchange session information 130 with the query system 110. Session information 130 may include data items used to provide certain search system functionality. Among other information included in the session information 130, the alternate provider agent 113 may determine a user intent for entering one or more search queries into browser application 128.

As used herein, a search result is data relating to a responsive item. The search result may include an app such as a mini-app which may include an app provider name (e.g., brand) and inline functionality that can take and respond to input inline (i.e., within the search result page or other UI). In some implementations, the search results may include a number of different on page apps responsive to the entered search query, provided by any number of service providers, and may be provided with full app functionality as presented in the search result(s).

In some implementations, the search result may also include a link. The link may initiate some action related to the responsive item. For example, a search result link may take the user to a web page, may start paying a video or audio file, may open a map application to a certain geographic location, may initiate a phone call, or perform some other action. A search result for an item may also include a small image or icon relating to the item. For example, a search result relating to an actor may include an image of the actor. A search result for a web page may include a preview of the web page, etc. A search result for an item may include a brief description of the item or information extracted from the item, also referred to as a snippet. A search result may include other information related to and/or describing the item. A search result can be a mini-app. Such a search result may include one or more click-through links that take the user to a full-featured application at a web site associated with the service provider. For example, a user may select a link in a provided mini-app. The browser 128 may navigate to the full-featured application from the link.

Query engine 112 may rank the responsive items. Ranking can include applying one or more ranking signals to a responsive item. Ranking signals can include many factors. Non-limiting examples are a PageRank for the item, a relevance score for the item, a source of the item, and many others. In addition to known ranking signals, the query engine 112 may also utilize a determined intent for ranking mini-apps in a search result list. The intent may be associated with the item or may be associated with a service provider offering the item. In some implementations, the query engine 112 may determine an intent associated with a received search query, as described in further detail below.

The query engine 112 may utilize alternate provider agent 113 to match the determined intent to a number of service providers in order to find additional search results (e.g., mini-apps). The multiple search results (e.g., mini-apps)

may be provided to the user in a UI to provide the advantage of enabling the user to quickly compare (at a summarized, but interactive app level) how each provider's search result matches the user needs and/or expectations.

In finding responsive items, the query system 110 may be responsible for searching one or more indices, represented collectively as item index 116. The item index 116 may include application content. The application content may include mini-apps, downloadable apps, web apps, or other app-based code or package. In some implementations, the item index 116 may include a web document index, e.g., an inverted index that associates terms, phrases, and/or n-grams with documents. Web documents can be any content accessible over the Internet, such as web pages, images, videos, PDF documents, word processing documents, audio recordings, etc. The item index 116 may also include an index of entities, for example from a knowledge base or knowledge graph. In a knowledge graph entities are modeled as nodes and facts about the entities are modeled as attributes or labeled relationships between entities. As used herein, an entity may refer to a physical embodiment of a person, place, or thing or a representation of the physical entity, e.g., text, or other information that refers to an entity. The item index 116 may also include an index of advertisements, which associates terms or phrases with advertising campaigns. Thus, a responsive item may be an advertisement from a campaign. The item index 116 may also include an index of proprietary documents, e.g., documents (including image, audio recordings, videos, etc.) accessible only via authentication. Accordingly, as used herein, items can refer to web documents, entities, ads, proprietary documents, images, recordings, etc.

The item index 116 may be stored on a tangible computer-readable storage device, for instance disk, flash, cache memory, or a combination of these, configured to store data in a semi-permanent or non-transient form. In some implementations, index 116 may be stored in a combination of various memories. The query engine 112 may obtain responsive items from the item index 116, rank the responsive items, generate a search result for at least some of the responsive items, and provide the search results to the query requestor, e.g., client 104.

In addition to finding responsive items, the query system 110 may also identify similar application items, e.g., from similar apps 118 or from the responsive items for the query. The similar application items may be related to a received query. The similar apps may be related to a specific responsive item. The similar apps may be related to a function of another responsive item in a search result list, for example. For example, the query system 110 may identify a list of responsive items that are of a similar type, category, etc., as a first displayed app and may display such identified responsive items along with the first displayed app. In some implementations, the query system 110 may select some of the items from the list for display as a combined search result, such as a library page of mini-apps described in further detail below, e.g., as illustrated in FIGS. 2A-4.

In a similar manner, a responsive item (e.g., mini-app) may be related to one or more other items (e.g., mini-apps), for example, because they appear together in search result pages or because they include similar functionality. Thus, rather than including several items with similar content, the search engine may include a top-ranked item with similar content and use the other items as suggested items for the top-ranked item. As another example, the similar apps 118 can include advertisements. The query system 110 may include advertisements that match keywords in the query. The advertisement may be an item the sponsor has chosen to be associated with the keyword. In some implementations, a responsive item may be associated with one or more keywords and the advertisement may be a suggested item for the responsive item.

As indicated above, the search engine 102 may identify a set of responsive items (e.g., search results responsive to an entered search query). The responsive items may be displayed on a search result page generated by the search engine 102 and provided to the client device 104. Some implementations may associate an icon, a brand, or other visual queue with each responsive item. The icon may serve as an indication of the type of the responsive item. The query system 110 may apply a ranking of the responsive items.

The query system 110 may be in communication with client(s) 104 over a network 120. Network 120 may be for example, the Internet, a cellular network, a wired or wireless local area network (LAN), wide area network (WAN), etc. The network 120 may represent multiple types of networks. Via the network 120, the query system 110 may communicate with and transmit data to/from clients 104 as well as with other domains (not shown).

Figure 8:
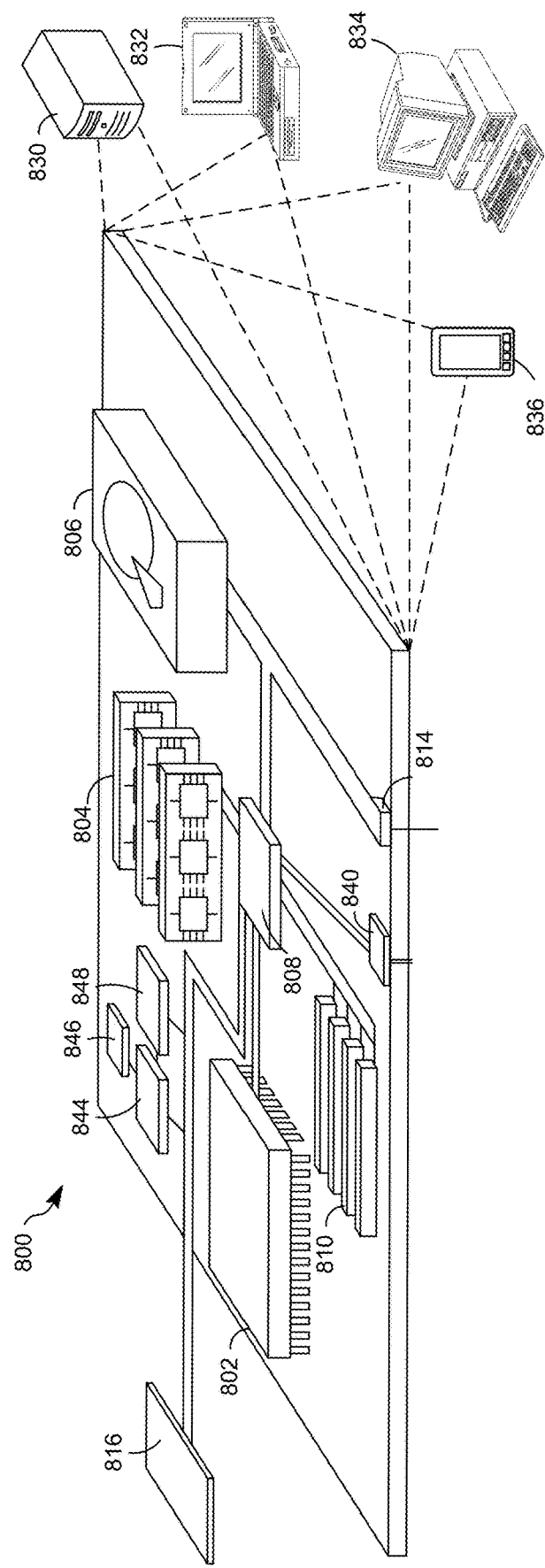
FIG. 8 shows an example of a computer device that can be used to implement the described techniques.

The search service system 100 may also include an alternate provider agent 113 that runs on the client 104. The client 104 may be an example of computer device 800, as depicted in FIG. 8. For example, the client 104 may be a personal computer, a mobile phone, a tablet, a laptop, a wearable device, a smart television, or the like. Client 104 may include one or more processors 124 formed in a substrate configured to execute one or more machine executable instructions or pieces of software, firmware, or a combination thereof. The processors 124 can be semiconductor-based—that is, the processors can include semiconductor material that can perform digital logic. Client 104 can also include one or more computer memories 126. The memories 126, for example, a main memory, may be configured to store one or more pieces of data, either temporarily, permanently, semi-permanently, or a combination thereof. The memories 126 may include any type of storage device that stores information in a format that can be read and/or executed by the one or more processors 124. The memories 126 may store applications, modules and/or engines that, when executed by the one or more processors 124, perform certain operations. In some implementations, the applications, modules, or engines, may be stored in an external storage device and loaded into the memory 126.

The applications may include any number of applications configured to execute on the client 104, such as an operating system, a messaging application, shopping applications, editing applications, search assistants, maps, etc. In particular, the applications include a browser 128. The browser 128 is operable to receive web page code (e.g., HTML, JavaScript, etc.) and render the web page for presentation to a user of the client 104. The client 104 thus includes a display device with a viewport. As used herein a viewport is a polygon region displaying content rendered by a browser. Conventionally a viewport is rectangular. The size of the viewport is device dependent, e.g., a viewport on a smartphone is smaller than the viewport of a personal computer or tablet. The content of a rendered web page may not all fit in the viewport. In such an instance, the user may scroll, e.g., execute a scroll action, to bring content into the viewport and move content out of the viewport. A scroll action is any input that the browser 128 (possibly in conjunction with an operating system of client 104) recognizes as executing a scroll to move content into the viewport. Example scroll actions are actuating a wheel on a mouse, a click-and-drag action, a swipe action (e.g., using a finger or stylus), actuation of scroll bars in a browser window, etc. The browser 128 thus displays scrollable content (e.g., a rendered webpage) and the viewport determines what portion of the content the user of client 104 can actually see, or in other words what portion of the content is visible.

The intent for a particular user or user-entered query may be dependent on a number of factors. In some implementations, intent may be a weighted combination of the factors. In some implementations, a machine learning algorithm, such as linear regression, logistic regression, a neural network, etc., may be used to determine the weights and/or whether the intent meets a predefined threshold. The factors may include, but are not limited to information that analyzed (when permissions are configured and provided by a user owning such information) from search history, saved login data, session input, etc.

The search engine 102 may also include or have access to service provider data 132. Service provider data may be information, metadata, intent mappings, API calls, access information, or other data that service providers 134 provide with or for a particular mini-app 136 and/or workflows 138. Service providers 134 may represent search engine providers, third party providers, app developers, advertisers, utility companies, gyms, restaurants, or other service-based entity that offers online services, and the like.

In some implementations, the service provider data 132 may include HTML data, links to images, code that specifies visual style pertaining to a particular mini-app, for example. In some implementations, the service provider data 132 may include images, data tables, graphs, snippets of text (e.g., descriptions, product recommendations, facts, etc.), pricing, inventory lists, and the like.

In some implementations, the service provider data 132 may be received at search engine 102 responsive to service provider 134 providing/registering a mini-app to the engine 102. In some implementations, the service provider data 132 may be fetched based on inclusion of markup and syntax associated with a mini-app (or an executable representing the mini-app) that may indicate that the mini-app is available for submission and presentation as a search result 140 served from engine 102. For example, the syntax and markup may be stored on an indexable portion of a service provider website. The search engine 102 may use indexing engine 114 to find the syntax and markup indicating an available mini-app. The available mini-app may then be provided as a search result 140 responsive to a user entered query on client device 104.

The search engine 102 may have access to one or more intent libraries 118. The intent libraries 118 may each be defined by particular keywords (e.g., search terms) and properties. In some implementations, the intent libraries 118 may include or pertain to particular categories, search terms, tasks, utterances, and properties related to categories, search terms, tasks, and utterances. In some implementations, the intent libraries 118 are part of (or otherwise have access to) service providers 134 and may be passed between search engine 102 and browser application 128. In some implementations, service providers 134 may populate intent libraries 118. For example, service providers 134 may register particular mini-apps 136 with the search engine 108 to be used in matching intents stored in the intent library 118. In some implementations, service providers 134 may populate intent libraries 118 in a scheduled and iterative fashion.

In some implementations, the service providers 134 may provide the search engine 108 mini-app data 150. The mini-app data 150 may include Application Programming Interface (API) access information, which represents software to allow applications (e.g., browser 108) to access particular features or data (e.g., mini-app data 150) for and/or in combination with accessing one or more mini-apps 136. In some implementations, the API may be used by the browser application 128 to trigger execution of a particular mini-app 136 for display and use in the browser, as shown by display of the mini-app 136 as mini-app instance 142, for example. The mini-app data may also include intent descriptions for matching to intent library 118. Such intent descriptions may represent which keywords match to which particular mini-app 136. In some implementations, the mini-app data 150 also includes other mini-app information for connecting a user to a service offered by a particular mini-app 136.

The service provider data 132 may include workflow data 152 provided by service providers 134. The workflow data 152 may include information about which mini-apps 136 may function well together, sequentially. For example, the workflow data 152 may indicate that a service provider's mortgage calculator works well with the same provider's savings calculator. In another example, the workflow data 152 may indicate that a particular set of mini-apps within apps 136 belong in a sequence indicating a useful workflow 138 for a user. The workflow data 152 may be used to identify, display, and/or rank particular mini-apps 136 for presentation to the user of browser 128, for example.

To populate a particular workflow, the system 100 may sort and/or filter mini-apps to be presented in a workflow 138, for example. Sorting and/or filtering may take into account past user input provided with permissions (e.g., search entries, sites visited based on tracked cookies, and/or login data for a browser or a third party). In some implementations, the system 100 may determine to display a particular mini-app 136 in a workflow 138 based at least in part on other user behaviors. For example, the search engine 102 may provide information regarding actions other users took after using a first mini-app in a workflow. That is, if a first user accessed a mini-app to pay a traffic ticket for a specific city, the first user may then select another mini-app for enrolling in traffic school. Accordingly, when a second user accesses the mini-app to pay a traffic ticket for the same city, the search engine 102 may provide the second mini-app for enrolling in traffic school to the user alongside the first mini-app to pay the traffic ticket. In this way, the second user may be provided an opportunity to access both mini-apps within one page without having to search for another mini-app.

In some implementations, machine learning and prediction techniques may be used to generate and provide mini-app workflows 138. For example, a machine learning system can be implemented by one or more of the computing devices described herein to facilitate generation and provision of a workflow of mini-apps. In some implementations, the alternate provider agent 113 may generate additional search results 140 based on the factors to provide mini-apps available from other (e.g., alternate) service providers (represented in service providers 134) that may be outside of the user's typical search behavior and/or that provide similar app functionality (matched to an intent from intent library 118) as provided by another displayed search result 140 (e.g., mini-app instance 142, library page 144, and/or related apps 146).

The library page 144 represents a set of apps that are related in some manner. For example, a library page may be curated by alternate provider agent 113 to display a number of mini-apps ranked according to a common workflow (e.g., workflow 138). The workflow 138 may use each app listed in the set of apps on the library page 144. For example, if the user wishes to pay a traffic ticket in New York State, the user may enter a search query such as "pay traffic ticket NY." In response, the browser 128 can trigger alternate provider agent 113 to determine an intent of the query by matching the intent behind the query to intent library 118, for example. The matched intent may be used to identify a number of mini-apps that may be used to pay a traffic ticket in New York. The alternate provider agent 113 may determine that a workflow (e.g., workflow 138) may help the user to complete his intended task. For example, the agent 113 may have knowledge regarding what typical users perform when attempting to pay a traffic ticket. In this example, the agent 113 may determine that the user has to pay the ticket, enroll in traffic school, and register his driving license with the Department of Transportation of New York State. Accordingly, the agent 113 may trigger a workflow that can be carried out by a number of mini-apps. The workflow (e.g., workflow 138) can be the basis for generating a library page 144 and ranking the mini-apps presented in the library page 144 in order of tasks of the workflow 138. For example, a first mini-app may be presented with a way to enter ticket information and pay the ticket from the library page 144. On the same page and at the same time, a second mini-app may be presented with a way to enroll in traffic school from the library page 144. On the same page and at the same time, a third mini-app may be presented with a way to register a driving license in a state.

The user may then simply follow the order of ranking of the mini-apps by entering data, selecting options, and/or otherwise manipulating provided controls to carry out steps in the first, second, and third mini-apps. In this way, the agent 113 may provide an option for the user to perform the workflow without having to search and click around on various websites and online applications.

In general, a library page 144 provides each mini-app in an expanded state that is ready to receive and trigger response to input inline with all of the search results. In some implementations, the user may be provided options to minimize particular mini-apps, but since each app is generally related to the workflow, it may be useful for the user to view the mini-apps in the expanded state. In addition, because the user may be provided the library page in a single browser session, session information 130 can be used to populate and/or pre-populate particular information associated with each of the provided mini-apps on the library page 144.

Related apps 146 may represent mini-apps that are related to one another via a search term, a service, an intent, a provider/owner name, and/or apps that are deemed similar and/or related because the apps pertain to use by a same workflow, and/or a same user or user account.

The alternate provider agent 113 may also send data to the search engine 102. For example, if a user enters information into a first mini-app in the search results and then selects upon a second mini-app provided by the alternative provider agent 113, the agent 113 may send the entered information from the first mini-app to the selected second mini-app via the search engine 102 (e.g., using the session information 130). The entered information for a session may be deleted when the session is closed regardless of permissions received by the user to share data amongst mini-apps accessed in a same session.

The browser application 128 may present search results 140 using any number of user interface (UI) layouts 148. Example UI layouts 148 may include stacked mini-apps, accordion aligned mini-apps, minimized/maximized mini-apps, horizontal and/or vertical carousels of mini-apps, mini-apps inline with standard search results, images, and links, or other UI layout based on the elements provided in each mini-app. In some implementations, the UI layout 148 may include presenting content in a contextual widget in which mini-apps 136 are presented adjacent to search content in a static fashion. In some implementations, the contextual widget may present mini-apps based on user interaction with other on-screen elements. In some implementations, the mini-apps may be triggered to be displayed to replace content, for example, after a delay, a dwell time expiration, or a page exit and return. For example, all or a portion of the search result page content may be replaced with new content related to one or more mini-apps 136 and/or mini-app based categorical listings. In some implementations, the mini-apps 136 may be presented as browsable and/or categorical listings in which a gallery of mini-apps are organized into lists of the mini-apps sorted by affinity to the user, usage by the user (or other users), and/or other methodologies including paid mini-app placement.

Further to the descriptions above, a user of client device 104 may be provided with controls allowing the user to make an election as to both if and when systems, programs, or features described herein may enable collection of user information (e.g., information about a user's activities, a user's preferences, or a user's current location), and whether the user is sent content or communications from a server, such as search engine 102. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user of client 104 may have control over what information is collected about the user, how that information is used, and what information is provided to the user and/or to the search engine 102 or alternate provider agent 113.

The client 104 may include one or more input devices, such as touch screen, keyboard, mouse, pointer, a microphone, a camera, one or more physical buttons, etc. The input devices may initiate input events, such as scrolling, link selection, cursor movement, which can be received and analyzed by the browser 128 and/or alternate provider agent 113. The client 104 may also include communications devices operable to send and receive data from other computing devices, such as another client, servers, search engine 102, etc., over one or more networks, such as network 120. The configuration of FIG. 1 represents one example configuration and implementations may incorporate other configurations.

Figure 2A:
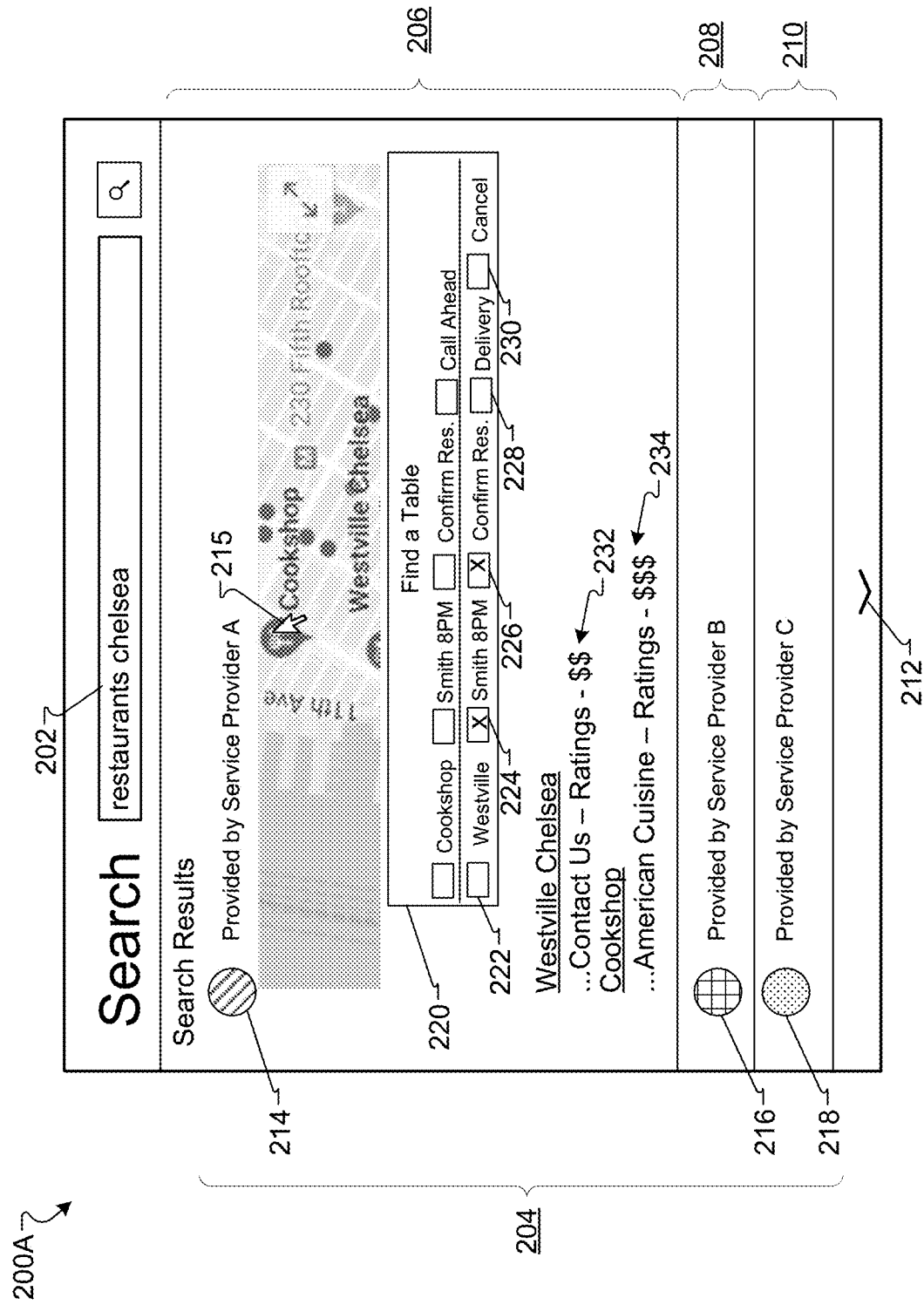
FIGS. 2A-2C illustrate example user interfaces showing example search results, in accordance with some implementations.

FIG. 2A illustrates an example user interface (UI) 200A showing example search results, in accordance with some implementations. The UI 200A may represent a portion of content available for viewing and as such, scrolling and/or panning around to uncover additional information may be possible. A query system, such as query system 110 of FIG. 1, may generate content to be rendered by a browser, such as browser 128 in response to a query 202. In the example of FIG. 2A, a user has submitted a query 202 of "restaurants chelsea." In response, search results 140 (e.g., search results 204) are provided. The content in the UI 200A includes a set of search results 204, e.g., search result 206, search result 208, search result 210, etc. Each search result is associated with a responsive item to query 202. The set of search results 204 may include additional search results not currently visible in the UI 200A. These additional search results may be moved into view, e.g., via a scrolling action. The set of search results 204 may be considered a first page (or first section) of search results. The UI 200A also includes a next page control 212 to move to other pages and/or sections of the UI 200A. In the example of FIG. 2A, a cursor 215 is also illustrated. The cursor 215 is proximate to the search result 206.

The search results 206, 208, and 210 represent three different service providers of mini-apps that provide restaurant-based interactive app functionality. The query engine 112 may function with the alternate provider agent 113 to match an intent behind the query 202 to search results offered by service providers (e.g., service provider A 214) and any number of alternate service providers (e.g., service provider B 216 and service provider C 218). For example, the alternate provider agent 113 may analyze intent associated with a search query to provide search results that pertain to the first service provider A 214 because the query and any intent associated with the query may indicate that the user has a particular affinity for service provider A 214. To discover additional search results for the user, the alternate provider agent 113 can assess the same intent to find alternate service providers that may offer similar or identical services e.g., via a mini-app. For example, the alternate service provider agent 113 may determine that other service providers offer similar apps (e.g., mini-apps) that pertain to the user's search for restaurants in Chelsea and that may provide additional options for the user to select and use. In this example, agent 113 determined that service provider B 216 and service provider C 218 both offer similar app-like content (e.g., mini-apps) within the browser/search result page of UI 200A. Accordingly agent 113 ranks and provides such mini-apps in the UI 200A. The agent 113 may provide alternate service providers 216 and 218, and/or additional service providers (not shown) to expose the user to other providers that may serve similar or the same intent queries. For example, the alternate provider agent 113 may utilize one or more intents to discover similar providers that may fulfill an intent associated with a received search query in a different or improved manner (e.g., cheaper, faster, login-free, locally-based, etc.).

In operation, the system 100 may identify a number of mini-apps (e.g., mini-apps associated with search result 206, search result 208, and search result 210). The mini-apps, in general, are generated by service providers (e.g., third party providers, search engines, etc.) and provided by the alternate provider agent 113. The mini-apps may be identified based on a determined intent (from the user, the session of browsing, the search terms, etc.) and a determined relationship between two or more of the service providers. The determined relationship between two or more of the service providers may include a determination that a capability of a first ranked mini-app (e.g., mini-app provided by service provider A 214) matches at least one capability of another of the mini-apps (e.g., mini-app provided by service provider B 216). For example, system 100 may determine that both mini-apps from service provider A 214 and service provider B 216 provide information and app content for restaurants in Chelsea, N.Y.

In some implementations, identifying the mini-apps generated by service providers is based on a determined lack of relationship with a user providing the search query. For example, the alternate provider agent 113 may select particular service providers based on the mini-app and/or service provider being unknown by the user, unused, or off brand to what the user typically accesses. In some implementations, the lack of relationship with the user may indicate that the user does not have an account with the brand of the mini-apps depicted in the search results (or that the user does not have an account with a particular service provider providing one or more of the mini-apps in the search results).

The system 100 may rank the mini-apps and may trigger rendering of the search results 204, for example. In some implementations, the search results include at least a first ranked mini-app in an expanded state (e.g., the mini-app provided by service provider A 214) and may also include a remaining plurality of the mini-apps in a collapsed state (e.g., as shown by search results 208 and 210). The first ranked mini-app provides a plurality of operational controls to operate a provided service, offered by the first ranked mini-app, from within the search results 204.

The search result 206 is provided by service provider A 214. The search result 206 represents an in-browser app (e.g., a mini-app) with functionality to request performance of services. For example, search result 206 includes a map showing two restaurants in Chelsea, N.Y., each of which are indicated with usable controls 220 which allow the user to interact and make selections with the two provided restaurants (e.g., "Westville Chelsea" and "Cookshop"). Example options shown in controls 220 include selection of a restaurant with control 222 (e.g., Westville), a control 224 with the name (e.g., Smith) of the user with a common time (e.g., 8 PM) that the user chooses to make a reservation, a control 228 to confirm the reservation, a control 228 to choose delivery, and a control 230 to request a cancellation of a reservation. Other options are of course possible and the options shown are for example purposes. Here, the user has selected control 224 to make a standard reservation, and has immediately confirmed the reservation using control 226.

In some implementations, additional search results or linked information may be provided within a search result. For example, search result 206 includes a number of controls 220, but also depicts an interactive map and links 232 and 234. Other information, controls, and links are possible.

As shown in FIG. 2A, the search result 208 and search result 210 are in a collapsed state. If the user wishes to use a different mini-app, the user may select upon another search result (e.g., 208 or 210 in this example). For example, at any time, the user may select search result 208. In this example, the user may have already selected content within search result 206 from service provider A 214, as shown by selections at controls 224 and 226. If the user then chooses search result 210, a UI 200B may be provided to the user. In this example, the UI 200A may condense, hide, or otherwise modify search result 206 in order to make search result 210 prominent in the UI 200B.

Figure 2B:
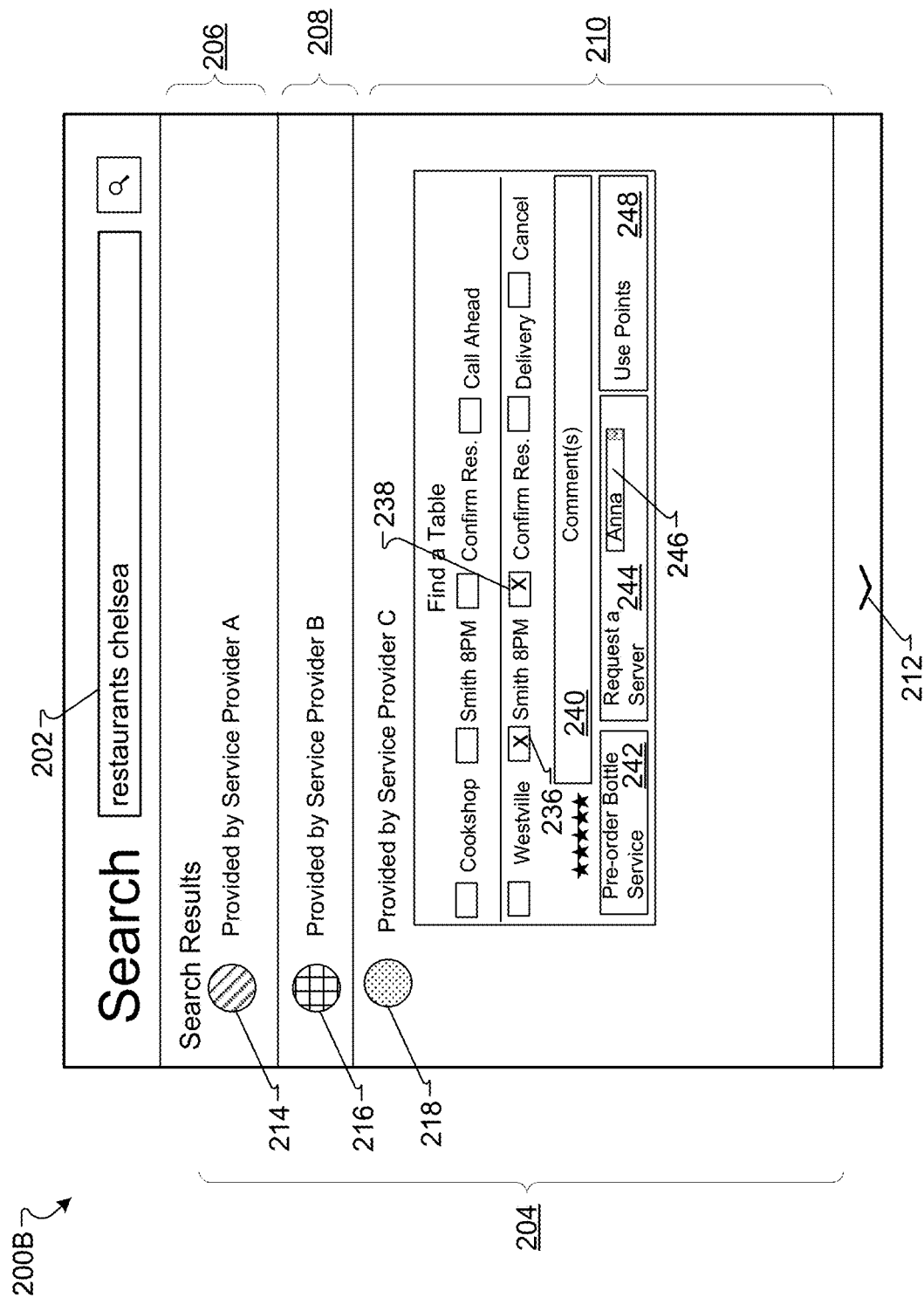

As shown in FIG. 2B, the user has selected service provider C 218 and in response, the browser 128 has expanded the search result 210 to provide a mini-app. If the user performed the switch from service provider A 214 to service provider C 218 in a same browsing session, the session information 130 may be used to transmit information, using alternate provider agent 113, from the mini-app provided by service provider A 214 to the mini-app provided by service provider C 218. This is shown at controls 236 and 238 indicating that the user had previously wanted to make a standard "8 PM" dinner reservation for "Smith" and to "confirm" the reservation. If the user selected service provider C 218 in a different session, such information may not be pre-populated. However, in some implementations, the information may be pre-populated by alternate provider agent 113, for example, if the user previously enabled permissions to allow storage of such pre-populatable information.

In operation, the browser 128 may receive input in the first ranked mini-app shown in FIG. 2A as expanded search result 206. Upon receiving selection of another ranked mini-app (e.g., the mini-app shown by search result 210 in FIG. 2A), the browser 128 can use the selection and session information 130, for example, to trigger a collapsing of the first ranked mini-app (e.g., as shown by search result 206 in FIG. 2B) and an expansion of the selected other mini-app (e.g., as shown by search result 210 in FIG. 2B). The selection can also trigger population of the selected other mini-app with the received input from the first ranked mini-app mapped to at least one field in the selected other mini-app.

In the example of FIG. 2B, the user is provided with additional options because the mini-app in search result 210 allows for additional controls. Here, the user may also provide comments at control 240, pre-order bottle service at control 242, select a server using control 244 and dropdown 246, and/or use points (e.g., via control 248) for making reservations, etc. In some implementations, the user may have selected service provider C 218 after entering data into search result 206 because the user remembered she had points to use (via control 248) with service provider C 218. Thus, because the alternate provider agent 113 generated and provided alternate provider options, the user is provided an advantage of additional options and controls and/or learning about previously unknown alternative payment methods for dining out.

Figure 2C:
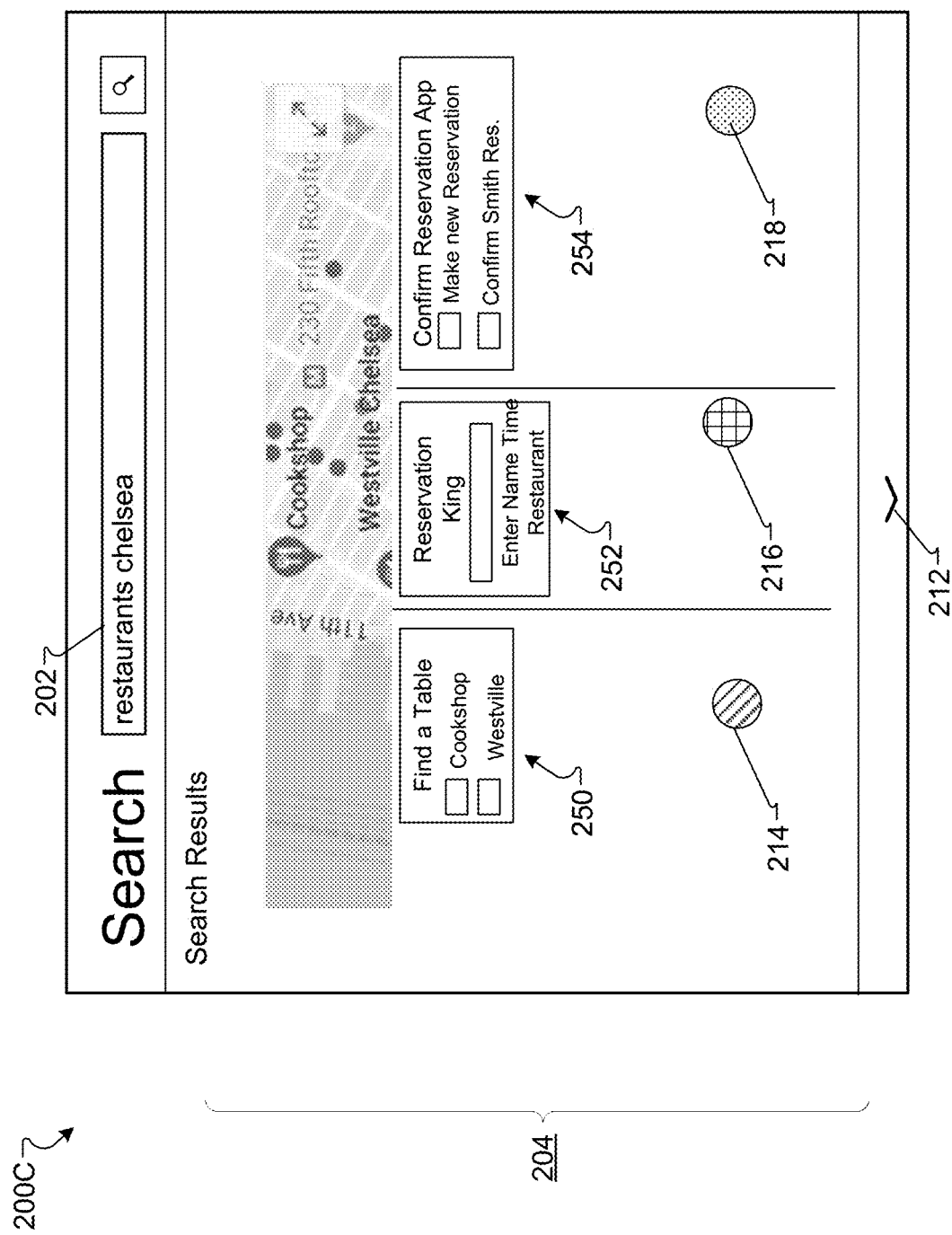

FIG. 2C illustrates another example UI 200C showing example search results, in accordance with some implementations. Similar to FIGS. 2A and 2B, a different layout of search results 204 is shown. However, in this example, the alternate provider agent 113 may generate and provide several service provider's mini-app based search results in a fully expanded state. In this example, a first mini-app 250 is shown and provided by service provider A 214, a second mini-app 252 is shown and provided by service provider B 216, and a third mini-app 254 is shown and provided by service provider C 218.

The alternate provider agent 113 may determine intent of the search query, which in this example, indicates that the user is searching for restaurants in Chelsea while planning a trip to New York in the same browsing session. Thus, the agent 113 may determine that provision of several apps from several service providers may offer the user an easy way to compare services and choose the one that fits the needs of the user. The user can begin using any of mini-apps 250, 252, and/or 254 without leaving the search results page. This may allow the user to set up one or more reservations and amenities without having to click through into various pages, websites, logins, etc.

Figure 3A:
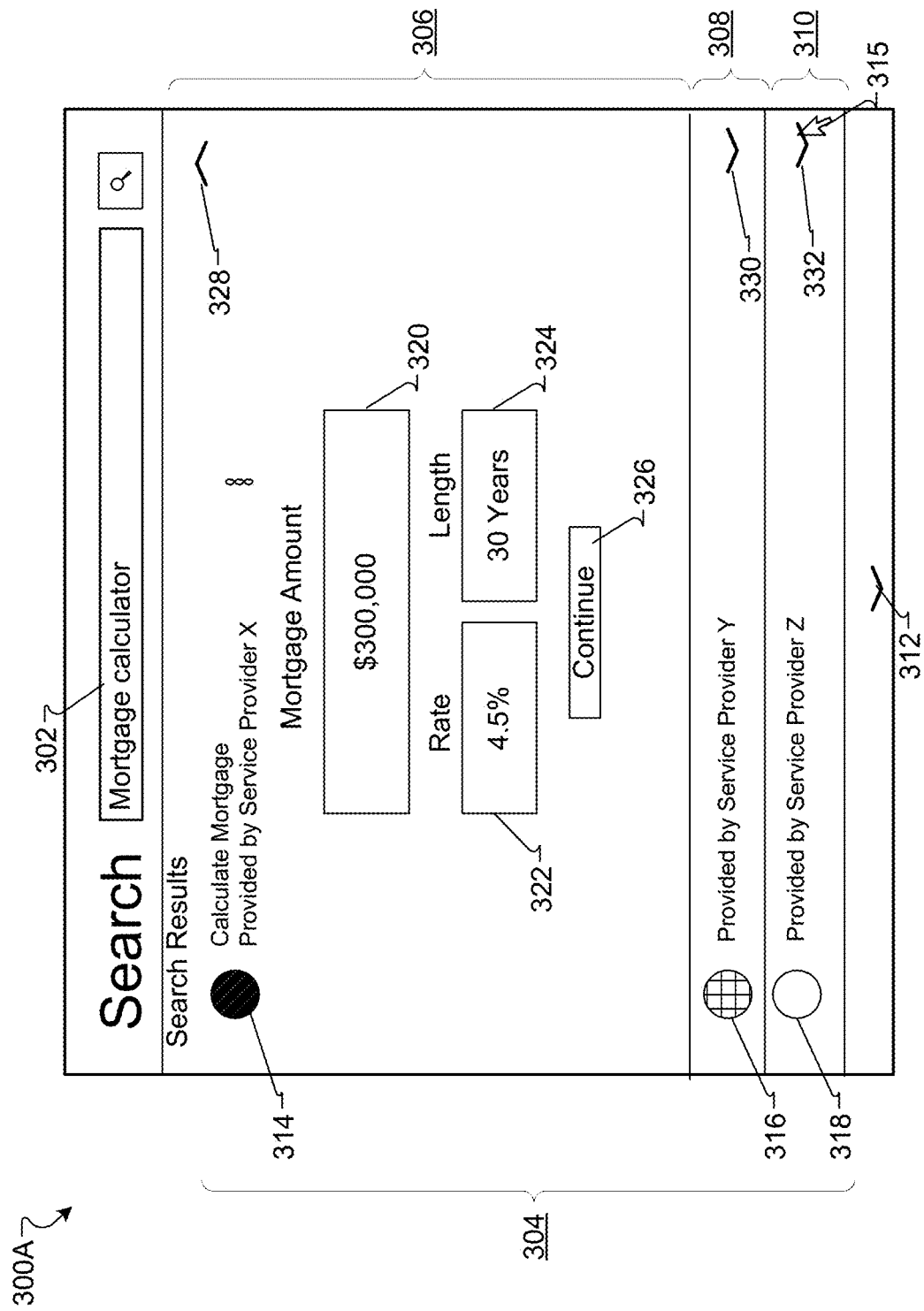
FIGS. 3A-3C illustrate example user interfaces showing example search results, in accordance with some implementations.

FIG. 3A illustrates an example UI 300A showing example search results, in accordance with some implementations. The UI 300A may represent a portion of content available for viewing and as such, scrolling and/or panning around to uncover additional information may be possible. A query system, such as query system 110 of FIG. 1, may generate content to be rendered by a browser, such as browser 128 in response to a query 302. In the example of FIG. 3A, a user has submitted a query 302 of "mortgage calculator." In response, search results 140 (e.g., search results 304) are provided. The content in the UI 300A includes the set of search results 304, e.g., search result 306, search result 308, search result 310, etc. Each search result is associated with a responsive item to query 302. The set of search results 304 may include additional search results not currently visible in the UI 300A. These additional search results may be moved into view, e.g., via a scrolling action. The set of search results 306 may be considered a first page (or first section) of search results. The UI 300A also includes a next page control 312 to move to other pages and/or sections of the UI 300A. In the example of FIG. 3A, a cursor 315 is also illustrated. The cursor 315 is proximate to the search result 306.

The search results 306, 308, and 310 represent three different service providers of mini-apps that provide mortgage-based interactive app functionality. The query engine 112 may function with the alternate provider agent 113 to match an intent behind the query 302 to search results offered by service providers (e.g., service provider X 314) and any number of alternate service providers (e.g., service provider Y 316 and service provider Z 318). For example, the alternate provider agent 113 may analyze intent to provide search results that pertain to the first service provider X 314 because the query and/or intent associated with the query may indicate that the user has a particular affinity for service provider X 314.

To discover additional search results for the user, the alternate provider agent 113 can assess the same intent to find alternate (e.g., alternative, different, non-overlapping, additional, etc.) service providers that may offer similar or identical services e.g., via a mini-app. For example, the alternate service provider agent 113 may determine that other service providers offer similar apps (e.g., mini-apps) that pertain to the user's search for mortgage calculators and that may provide additional options for the user to select and use. In this example, agent 113 determined that service provider Y 316 and service provider Z 318 both offer similar app-like content (e.g., mini-apps) within the browser/search result page shown in UI 300A. Accordingly agent 113 ranks and provides such mini-apps in the UI 300A. The agent 113 may provide alternate service providers 316 and 318, and/or additional service providers (not shown) to expose the user to other providers that may serve similar or the same intent queries related to determining mortgage calculations in this example. To do so, the alternate provider agent 113 may utilize one or more intents to discover similar providers that may fulfill an intent associated with a search query in a different or improved manner (e.g., cheaper, faster, login-free, locally-based, etc.). In some implementations, particular mini-apps and/or service providers are selected and ranked for provision in search results based on a sponsored intent fulfillment of a browser or search page. For example, particular mini-apps may be provided as a fully functional mini-app within a UI, but may be placed in the search results for advertisement purposes.

Referring to FIG. 3A, the search query 302 has been entered into UI 300A (e.g., via browser 128 or another UI surface). The alternate provider agent 113 (within browser 128 or another application for performing search queries) may determine an intent from an intent library that matches the received search query to find a number of mini-apps generated by a plurality of service providers. The determined mini-apps can be ranked and provided to the user as search results 304, for example. Although three search results 306, 308, and 310 are depicted, any number of search results and/or mini-apps may be provided in the example interfaces described herein.

The user has entered a mortgage amount with control 320, selected a rate with control 322, and selected a length of the mortgage with control 324. The user may have the mini-app mortgage calculator (shown by search result 306) calculate a mortgage if the user selects control 326. However, if instead the user wishes to switch between mini-apps in search results 306, 308, and 310, the user may toggle on or off the controls 328, 330, or 332. For example, the user is viewing expanded search result 306, but may minimize the search result 306 by selecting on control 328. Alternatively, the search result 306 may be automatically minimized if the user selects another control (e.g., control 330 or 332) to maximize another search result.

Figure 3B:
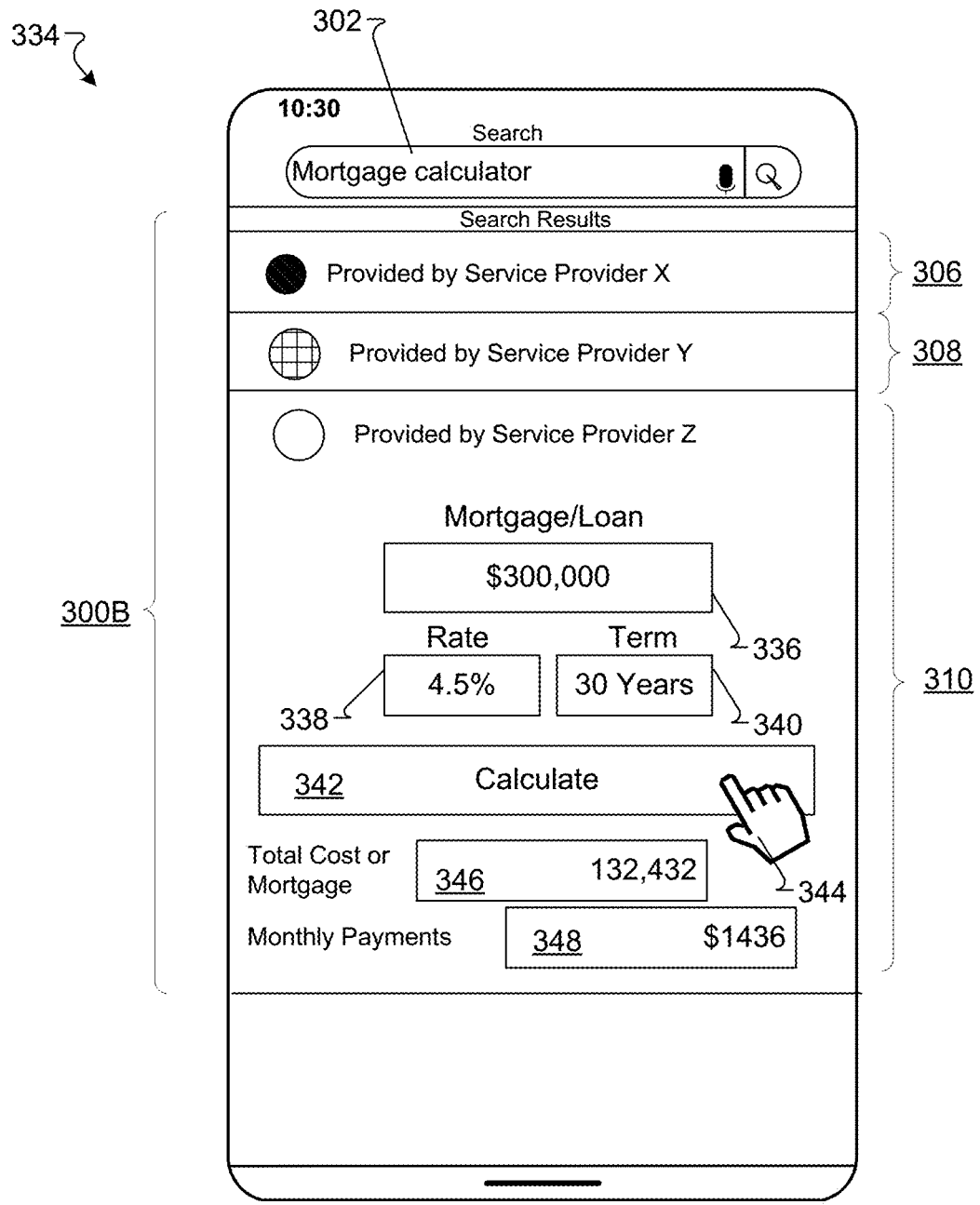

FIG. 3B illustrates an example UI 300B showing example search results, in accordance with some implementations. Here, the user entering data into FIG. 3A selected upon control 332 to trigger expansion of search result 310. In this example, the UI 300B is depicted in a mobile device 334 because the user began using a mobile device to access the same content (e.g., accessed via an account login) that is depicted on a device showing UI 300A.

The user is still in a same session, but has switched devices.

In this example, the user did not select the continue control 326 (FIG. 3A), but instead selected expansion control 332 (FIG. 3A) which triggered expansion of search result 310 (FIG. 3B). Because the user is within a same session, session information 130 can be used between sessions to populate content between similar mini-apps. For example, the browser 128 executing a user-requested session may have received the input in the first ranked mini-app (e.g., the mortgage mini-app in search result 306 of FIG. 3A). The browser 128 then received selection upon another ranked mini-app within the search results (e.g., control 332 in FIG. 3A was selected). Selection of control 332 (FIG. 3A) may trigger a collapsing of the first ranked mini-app (e.g., collapsed search result 306 and collapsing of the corresponding mini-app. Selection of control 332 (FIG. 3A) may also trigger an expansion of the selected other mini-app (e.g., the mini-app associated with search result 310. Selection of control 332 (FIG. 3A) may additionally populate the selected other mini-app with the received input (e.g., mortgage data $300,000, Rate 4.5 percent, and 30 year term) from the first ranked mini-app, as shown by populated fields/controls 336, 338, and 340. In this example, the data representing controls 320, 322, and 324 is mapped to one or more fields in the selected other mini-app (e.g., min-app associated with search result 310 (FIG. 3B). If the user wishes to continue to use the mini-app provided in search result 310, the user may select a calculate control 342, as indicated by cursor selection icon 344. In response, the mini-app may generate calculations 346 and 348 and display the related data in the respective control fields.

Figure 3C:
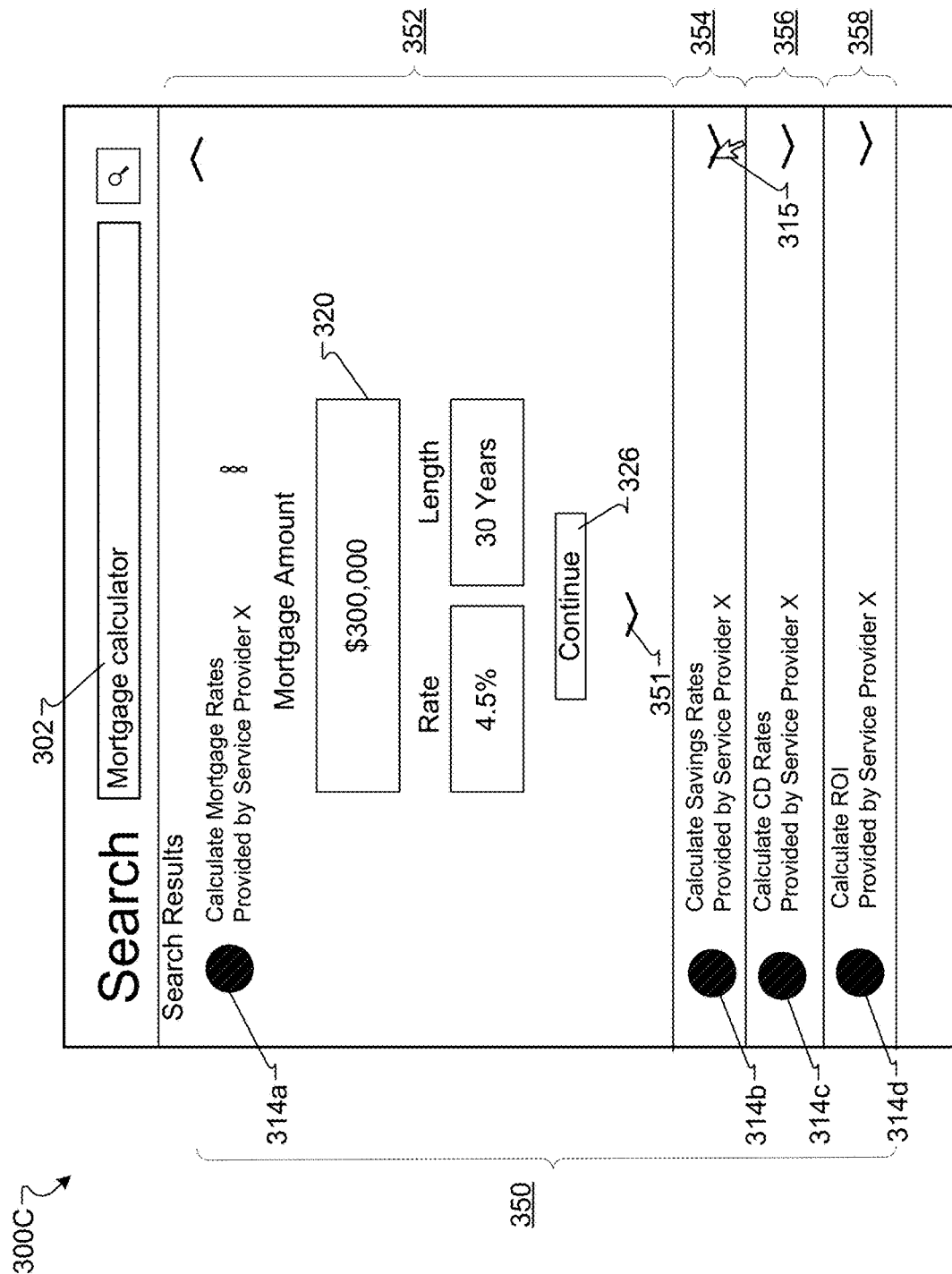

FIG. 3C illustrates an example UI 300C showing example search results, in accordance with some implementations. The UI 300C may represent a portion of content available for viewing and as such, scrolling and/or panning around to uncover additional information may be possible. A query system, such as query system 110 of FIG. 1, may generate content to be rendered by a browser, such as browser 128 in response to a query 302. In the example of FIG. 3C, a user has submitted the query 302 of "mortgage calculator." In response, search results 140 (e.g., search results 350) are provided. The content in the UI 300C includes the set of search results 350, e.g., search result 352, search result 354, search result 356, and search result 358, etc. Although four search results 352, 354, 356, and 358 are depicted, any number of search results and/or mini-apps may be provided in the example interfaces described herein.

Each depicted search result (with a mini-app) is associated with a responsive item to query 302. The set of search results 350 may include additional search results not currently visible in the UI 300C. These additional search results may be moved into view, e.g., via a scrolling action. The set of search results 350 may be considered a first page (or first section) of search results. The UI 300C also includes a view more control 351 to move to other pages and/or sections of the UI 300C. In some implementations, the view more control 351 may be triggered for rendering if additional mini-apps exist, but the first ranked mini-app takes up real estate on the search result page that would overlap additional mini-app listings. In response to receiving a selection on the view more control 351, the search engine 108 may trigger the browser application 128 to rank and populate additional mini-apps that match the determined intent. For example, the additional mini-apps may include search results 354-358. The additional mini-apps may be rendered in a collapsed state, as shown by search results 354-358.

The search results 352, 354, 356, and 358 represent mini-apps provided by the same service provider X (indicated by respective icons 314a, 314b, 314c, and 314d). Each mini-app provided in the search results is provided in response to the query 302. For example, the query engine 112 may function with the alternate provider agent 113 to match an intent from intent library 118 to an intent behind the query 302 to provide search results offered by service providers (e.g., service provider X 314). For example, the alternate provider agent 113 may analyze intent to provide search results that pertain to the first service provider X 314 because the query and/or intent associated with the query may indicate that the user has a particular affinity for service provider X 314. In some implementations, the name of the service provider 314 may be provided as part of the query, which may be matched to an intent in intent library 118.

To discover search results for the user, the alternate provider agent 113 can assess the intent, compare the intent with the intent library 118 to find alternate (e.g., alternative, different, non-overlapping, additional, etc.) service providers and/or alternate mini-apps that may be responsive to the same intent (e.g., offer similar or identical services e.g., via a mini-app, match keywords in the intent library 118, etc.). For example, the alternate service provider agent 113 may determine that the same service provider 314 offers other service offerings via a mini-app and may provide those mini-apps in search results as well. For example, the alternate provider agent 113 may have received "mortgage calculator" and "Service Provider X" in search query control shown by query 302. In response, the agent 113 may retrieve additional mini-apps that include the service provider, which matches the intent of the query. In this example, the agent 113 provided a savings rate calculator mini-app (e.g., search result 354), a CD rate calculator (e.g., search result 356), and an ROI calculator (e.g., search result 358). The mini-apps of search results 354-358 are shown in a collapsed state while the search result 352 is shown in an expanded state.

In some implementations, the particular service provider (and associated one or more mini-apps) may be selected based on both the determined intent and a determination that the provider is associated with a user entering the query. For example, determining the association of the provider to the user may include determining that the provider is a search term in the query.

Referring to FIG. 3C, the search query 302 has been entered into UI 300C (e.g., via browser 128 or another UI surface). The alternate provider agent 113 (within browser 128 or another application for performing search queries)

may determine an intent from the intent library 118 that matches at least a portion of the received search query to find a number of mini-apps generated by one or more service providers. In this example, part of the intent may be matched to a single service provider name because search results 350 include search results (e.g., mini-apps) from a single provider 314. The determined mini-apps can be ranked and provided to the user as search results 350, for example.

The user has entered a mortgage amount with control 320, selected a rate with control, and selected a length of the mortgage. The user may have the mini-app mortgage calculator (shown by search result 352) calculate a mortgage if the user selects control 326. However, if instead the user wishes to switch between mini-apps in search results 354, 356, or 358, the user may select another search result. In this example, the user selected search result 354, as shown by cursor 315 to trigger minimizing search result 352 while expanding search result 354.

Figure 4:
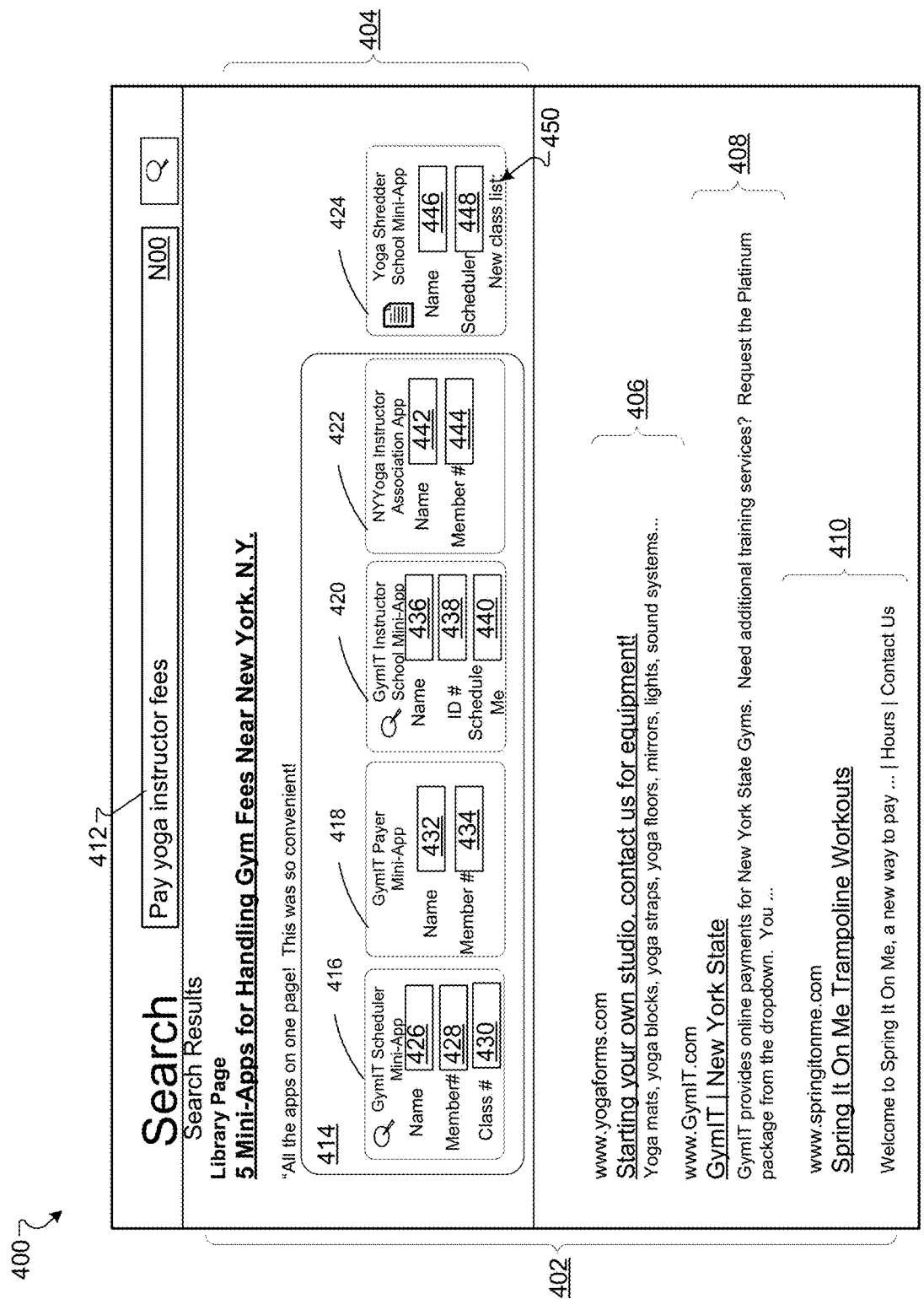
FIG. 4 illustrates another example user interface showing example search results provided by various service providers, in accordance with some implementations.

FIG. 4 illustrates another example UI 400 showing example search results 402 provided by various service providers, in accordance with some implementations. The search results 402 include a library page search result 404 and additional search results 406, 408, and 410. The library page search result 404 represents a set of apps that are related in some manner. In this example, the library page search result 404 may be curated by alternate provider agent 113 to display a number of mini-apps ranked according to a workflow 414 determined to assist the user in carrying out online tasks.

As shown in FIG. 4, the search result 404 represents a library page with a workflow 414 (e.g., workflow 138) that includes four example mini-apps (e.g., mini-apps 416, 418, 420, and 422) from service provider 134, for example. The agent 113 may have determined that the user is a new student currently enrolled for yoga instruction at "GymIT." The agent 113 may have also determined that the user has previously used mini-app 414 to schedule classes and mini-app 416 to pay fees while taking classes as a student, but may have determined that the user has not paid fees as an instructor before. Therefore, the alternate provider agent may have searched for additional one or more mini-apps to assist the user with a new task in a determined workflow. In this example, the agent 113 may have found and provided mini-app 420 in the workflow 414 based on an understanding that instructor classes are billed differently than student classes, for example. Other rules and intents may apply and the examples described herein are provided to illustrate the concepts of the techniques of this disclosure.

The agent 113 may have provided mini-app 422 in the workflow 414 based on determining additional mini-apps that may be useful to the user. Here, the alternate provider agent 113 may have information about requirements for yoga instructors in New York, N.Y., which may have a rule that instructors are to register with the instructor association of New York. Therefore, the agent 113 may provide the mini-app 422 to enable the user to register and to do so within the workflow 414 on the search result page of UI 400, for example.

Further, the agent 113 may provide other mini-apps and search results to provide the user with alternative options for carrying out the intent that the user had when entering search query 412. For example, the mini-app 424 is provided as an alternative yoga school. The agent 113 may determine that the user may be curious about other yoga schools and programs. In some implementations, the agent 113 or browser 128 may generate and provide other traditional search results, such as search results 406, 408, and 410 based on the same intent and/or rules.

The browser 128 may rank or otherwise organize workflow 414 so that each app listed in the set of apps on the library page search result 404 is provided to the user in a determined order. In some implementations, the browser 128 ranks the mini-apps in workflow 414 according to which service provider generated the respective mini-app. For example, mini-apps 416, 418, and 420 are listed together based on being provided by the "GymIT" entity. Additional mini-app 422 is listed next and another service provider's mini-app (e.g., mini-app 424) is provided after that.

As an example implementation of UI 400, the user may wish to pay gym fees in New York, N.Y. and may do so by entering a search query 412 such as "pay yoga instructor fees." In response, the browser 128 can use/trigger alternate provider agent 113 to determine an intent of the query by matching the intent behind the query to one or more intents stored in intent library 118 for example. The matched intent may be used to identify a number of mini-apps that may be used to pay gym fees in New York.

In this example, the workflow of mini-apps may be presented as shown in FIG. 4 because the alternate provider agent 113 determined that a workflow may help the user to complete an intended task of paying fees for classes as an instructor, but may also assist or teach the user about other tasks that may be carried out based on the intent and/or other determined context associated with the query 412. For example, the agent 113 may have knowledge regarding what typical users perform when attempting to pay fees, schedule classes and attend instructive classes for "GymIT."

The user may then simply follow the order provided by the ranked mini-apps in the workflow 414 by entering data, selecting options, and/or otherwise manipulating provided controls (e.g., controls 426-448) to carry out steps in the mini-apps 416-424. In this way, the agent 113 provides the advantage of offering a convenient option for the user to perform the workflow 414 without having to search and click around on various websites and online applications. The user may also skip any or all mini-apps 416-424 in the workflow 414.

In general, the library page search result 404 provides each mini-app 416-422 of workflow 414 in an expanded state that is ready to receive and trigger response to input inline with all of the search results 402. In some implementations, the user may be provided options to minimize particular mini-apps. In some implementations, other applications (e.g., mini-app 424) may also be in an expanded state (as shown) or alternatively in a minimized state. In addition, because the user may be provided the library page search result 404 in a single browser session, session information 130 can be used to populate and/or pre-populate particular information associated with each of the provided mini-apps 416-424.

In some implementations, the mini-app 422 and/or mini-app 424 are provided based on a determination that the user that provided the search query 412 does not have a relationship with particular service providers. For example, the alternative provider agent 113 may provide mini-apps that provide a same intent as the user is exhibiting via the search query 412 and/or other gathered data, but the user may not currently have an account with the service provider providing mini-app 422 and/or mini-app 424. The agent 113 may provide such suggested mini-apps to expose new service providers to the user. In some implementations, the agent 113 may determine that a different brand (e.g., service provider) offers additional services to the user than the service providers in which the user does have an account. Thus, the suggested mini-app 424, for example, may be provided to surface the additional services (e.g., new class list 450).

Figure 5:
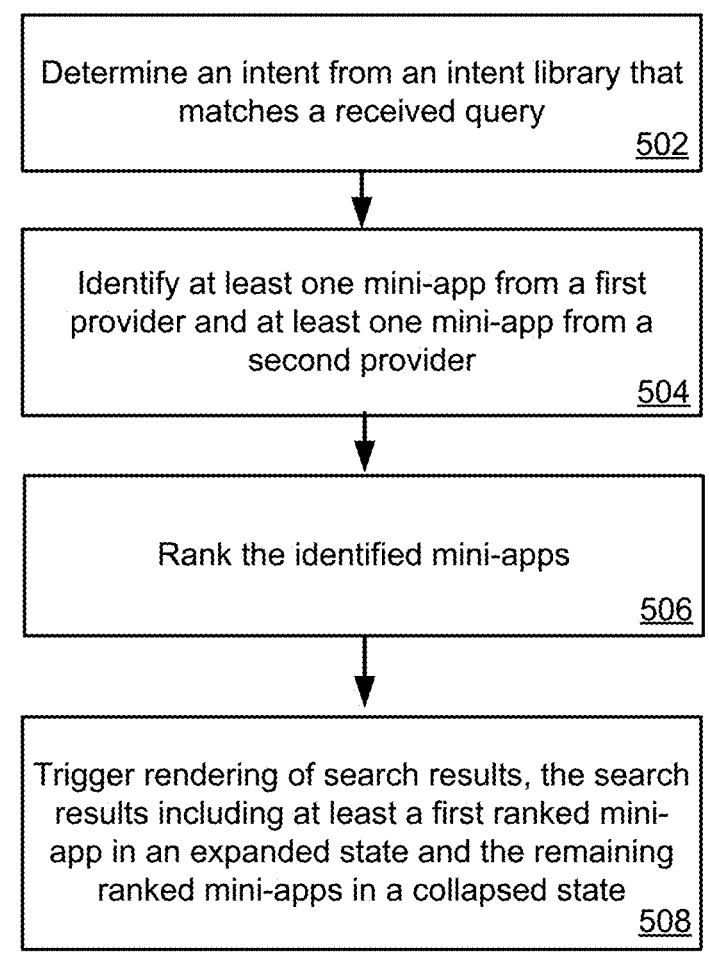
FIG. 5 is a flow chart diagramming an implementation of an example process to respond to a search query, in accordance with some implementations.

FIG. 5 is a flow chart diagramming an implementation of an example process 500 to respond to a search query, in accordance with some implementations. In this example, search results 140 are generated by system 100 and triggered for display within a UI (e.g., browser 128). The process 500 is described with respect to an example implementation using one or more of the elements of system 100 in FIG. 1 and/or using user interfaces described in FIGS. 2A-4, but it will be appreciated that the method can be implemented at systems having other configurations.

At block 502, the process 500 includes determining an intent from an intent library that matches a received query. For example, a user may enter a search query 302 (FIG. 3A) in a browser application 128, for example. The browser may send the search query 302 to the search engine 102. The search engine 102 may ascertain an intent from the keywords by matching one or more keywords in the search query to one or more intents in intent library 118.

At block 504, the process 500 includes identifying at least one mini-app from a first provider and at least one mini-app from a second provider. The identification of the mini-apps may be based on the determined intent. For example, the first mini-app may match a portion of the keywords in the search while the second mini-app matches another of the keywords in the search. For example, the user provided a search query of "mortgage calculator" at search query 302 (FIG. 3A). The keyword "mortgage" may trigger determination of an intent from service providers that provide mortgages. Examples of different service providers that offer mortgage-based data are shown FIG. 3A and FIG. 3B. The second keyword "calculator" may also be used to determine an intent and identify one more mini-apps. For example, the alternate provider agent 113 may identify a first search result 306 (FIG. 3A) from a first provider 314, a second search result 308 from provider 316, and so on. In a similar fashion, the alternate provider agent 113 may identify additional search results that provide calculators as mini-apps, as shown in FIG. 3B and FIG. 3C.

At block 506, the process 500 includes ranking the identified mini-apps. For example, the alternate provider agent 113 in combination with query engine 112 and/or indexing engine 114, for example, may rank the identified mini-apps, which results in ranking the search results 304, for example. In some implementations, ranking of the identified mini-apps is based at least in part on a determined affiliation between a user providing the query 302 and the first provider (e.g., provider 314) or the second provider (e.g., provider 318). In some implementations, determining the affiliation of the user to the first provider or the second provider includes determining that the respective provider is provided as a search term (e.g., provider X or provider Z) in the query 302. In some implementations, the determined affiliation of the user to a particular service provider can include having a detected account with the particular service provider. In some implementations, the determined affiliation of the user to a particular service provider includes prior use of a mini-app associated with the particular service provider. In some implementations, particular mini-apps may also be selected based on a determined lack of relationship between a user providing the query and the first provider or the second provider. In some implementations, particular search results (e.g., including a mini-app) may be ranked based on the lack of relationship. In one example, the search result may be ranked higher in the event that a lack of relationship is determined to for example, provide new or previously unknown service provider offerings to a user.

At block 508, the process 500 includes triggering rendering of search results. For example, search results 304 may be displayed in the browser 128 (or other UI). The rendered search results may include at least a first ranked mini-app (e.g., mini-app shown in search result 306 in FIG. 3A) in an expanded state and the remaining ranked mini-apps (e.g., shown in search results 308 and 310 in FIG. 3A) in a collapsed state.

Other variations are possible. For example, the user may preconfigure all search results to be expanded when displayed in a browser. As such, each mini-app of a search result may be provided in an expanded state. Expanded state may pertain to maximizing content, unveiling content, or otherwise depicting additional content associated with a mini-app of a search result.

In some implementations, the process 500 may include receiving additional input after the content shown in FIG. 3A is depicted to a user in response to the entered query 302. For example, an input (e.g., "300,000" and/or "4.5" and/or 30 Years") may be received in the first ranked mini-app (e.g., search result 306). Additional input may also be received in the first ranked mini-app. However, if the user has entered input, but wishes to change which mini-app she is accessing, the user may provide another input making a selection. For example, the browser 128 may receive a selection upon another mini-app (e.g., search result 310). The selection may trigger a collapsing of the first ranked mini-app (e.g., search result 306 in FIG. 3B), an expansion of the selected other mini-app (e.g., search result 310 in FIG. 3B), population of the selected other mini-app (e.g., mini-app in search result 310) with the received input (e.g., "300,000," and/or "4.5" and/or 30 Years") from the first ranked mini-app (e.g., search result 306) mapped to at least one field (e.g., Mortgage/Loan field 336 and/or rate field 338 and/or term field 340) in the selected other mini-app.

In some implementations, the browser 128 may trigger rendering of a view more control 312 that when selected, ranks and populates additional mini-apps that match the determined intent. In general, the additional mini-apps may be presented initially in a collapsed state until receiving a selection upon the mini-app (or selection on or within a particular search result area on a search result list).

Figure 6:
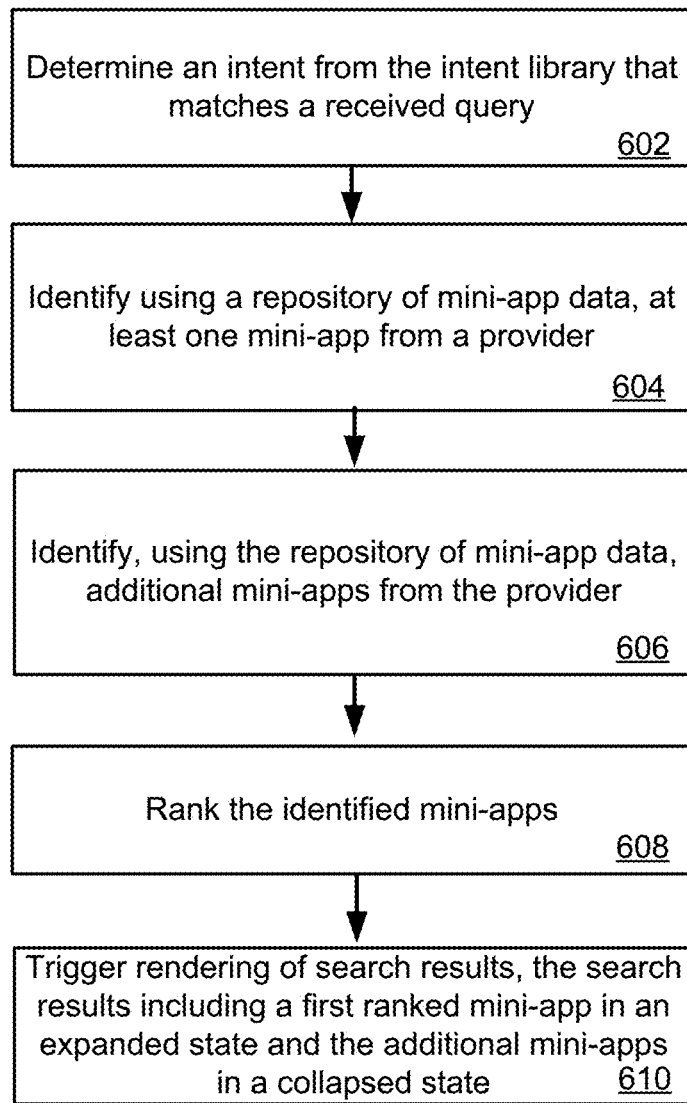
FIG. 6 is a flow chart diagramming an implementation of another example process to respond to a search query, in accordance with some implementations.

FIG. 6 is a flow chart diagramming an implementation of another example process 600 to respond to a search query, in accordance with some implementations. In this example, search results 140 are generated by system 100 and triggered for display within a UI (e.g., browser 128). The process 600 is described with respect to an example implementation using one or more of the elements of system 100 in FIG. 1 and/or using user interfaces described in FIGS. 2A-4, but it will be appreciated that the method can be implemented at systems having other configurations. In some implementations, the process 600 may have access to at least one intent library (e.g., intent library 118) and a repository of mini-app data (e.g., mini-app data 150).

At block 602, the process 600 includes determining an intent from the intent library that matches a received query. For example, a user may enter a search query 302 (FIG. 3C) in a browser application 128, for example. The browser may send the search query 302 to the search engine 102. The search engine 102 may ascertain an intent from the keywords by matching one or more keywords in the search query to one or more intents in the intent library 118. In some implementations, the search engine 102 may employ alternate provider agent 113 to assess intent, providers, or other search result related data.

At block 604, the process 600 includes identifying, using the repository of mini-app data, at least one mini-app from a provider. The identification of the mini-apps may be based on the determined intent. For example, the first mini-app may match a portion of the keywords in the search while the second mini-app matches another of the keywords in the search. For example, the user provided a search query of "mortgage calculator" at search query 302 (FIG. 3A). The keyword "mortgage" may trigger determination of an intent from service providers that provide mortgages. Examples of different service providers that offer mortgage-based data are shown FIG. 3A and FIG. 3B. The second keyword "calculator" may also be used to determine an intent and identify one more mini-apps. For example, the alternate provider agent 113 may identify a first search result 306 (FIG. 3A) from a first provider 314, a second search result 308 from provider 316, and so on. In a similar fashion, the alternate provider agent 113 may identify additional search results that provide calculators as mini-apps, as shown in FIG. 3B and FIG. 3C.

By way of example, discovering at least one mini-app from a provider (e.g., search results for the user) may include the alternate provider agent 113 assessing the intent and comparing the intent with the intent library 118 to find alternate (e.g., alternative, different, non-overlapping, additional, etc.) service providers and/or alternate mini-apps that may be responsive to the same intent (e.g., offer similar or identical services e.g., via a mini-app, match keywords in the intent library 118, etc.).

In some implementations, the at least one mini-app (e.g., search result 352 in FIG. 3C) is selected based on the intent and a determination that the provider 314 is associated with a user entering the query 302. Determining the association of the provider to the user may include determining that the provider is a search term in the query. For example, the search query may have been "Provider X mortgage calculator," which may trigger mortgage calculators from Provider X to be selected and/or ranked highly in a list of search results since the "Provider X" matches a service provider in the service providers 134 (or alternatively indicated in the intent library 118).

In some implementations, determining The system of claim 9, wherein determining the association of the provider to the user includes determining that the user is logged into a user account associated with the provider.

At block 606, the process 600 includes identifying, using the repository of mini-app data, additional mini-apps from the provider. For example, the alternate service provider agent 113 may determine that the same service provider 314 (FIG. 3C) offers other service offerings via a mini-app and may provide those mini-apps in search results as well. For example, the alternate provider agent 113 may have received "mortgage calculator" and "Service Provider X" in search query control shown by query 302. In response, the agent 113 may retrieve additional mini-apps that include (or are offered by) the same service provider, which matches the intent of the query. In this example, the agent 113 provided a savings rate calculator mini-app (e.g., search result 354), a CD rate calculator (e.g., search result 356), and an ROI calculator (e.g., search result 358).

At block 608, the process 600 includes ranking the identified mini-apps. For example, the alternate provider agent 113 in combination with query engine 112 and/or indexing engine 114 may rank the identified mini-apps, which results in ranking the search results 352, 354, 356, and 358 in FIG. 3C, for example. In some implementations, ranking of the identified mini-apps is based at least in part on a determined affiliation between a user providing the query 302 and the first provider (e.g., provider X). In some implementations, determining the affiliation of the user to the first provider or the second provider includes determining that the respective provider is provided as a search term (e.g., provider X) in the query 302. In some implementations, the determined affiliation of the user to a particular service provider can include having a detected account with the particular service provider. In some implementations, the determined affiliation of the user to a particular service provider includes prior use of a mini-app associated with the particular service provider. In some implementations, particular mini-apps may also be selected based on a determined lack of relationship between a user providing the query and the provider of the mini-app(s). In some implementations, particular search results (e.g., including a mini-app) may be ranked based on the determined lack of relationship.

At block 610, the process 600 includes triggering rendering of search results. The search results may include a first ranked mini-app in an expanded state and the additional mini-apps in a collapsed state. By way of example, the mini-apps of search results 354-358 (FIG. 3C) are shown in a collapsed state while the search result 352 is shown in an expanded state.

In some implementations, additional controls may be provided. For example, the system 100 may trigger rendering of the view more control 351 that when selected ranks and populates additional mini-apps (e.g., shown in search results 354-358). The additional mini-apps may be determined to match the determined intent. The additional mini-apps may be rendered in a collapsed state.

Figure 7:
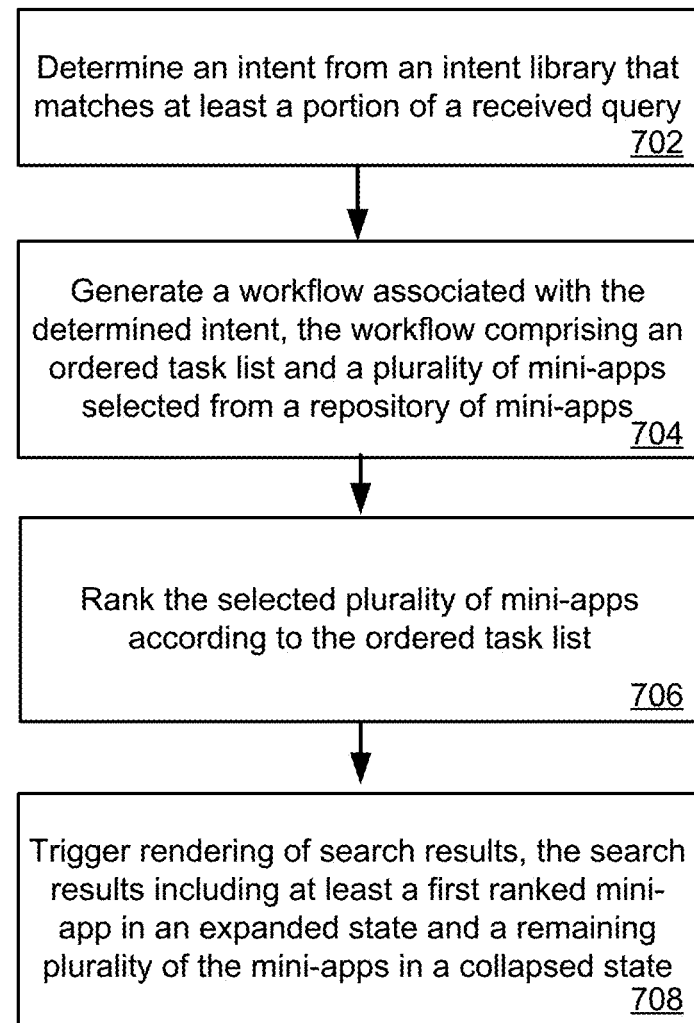
FIG. 7 is a flow chart diagramming an implementation of yet another example process to respond to a search query, in accordance with some implementations.

FIG. 7 is a flow chart diagramming an implementation of yet another example process 700 to respond to a search query, in accordance with some implementations. The process 700 is described with respect to an example implementation using one or more of the elements of system 100 in FIG. 1 and/or using user interfaces described in FIGS. 2A-4, but it will be appreciated that the method can be implemented at systems having other configurations. In some implementations, the process 700 may have access to at least one intent library (e.g., intent library 118) and a repository of mini-app data (e.g., mini-app data 150).

At block 702, the process 700 includes determining an intent from an intent library that matches at least a portion of a received query. For example, a user may enter a search query 412 (FIG. 4) in a browser application 128, for example. The browser may send the search query 412 to the search engine 102. The search engine 102 may ascertain an intent from the keywords by matching one or more keywords in the search query to one or more intents in the intent library 118. In some implementations, the search engine 102 may employ alternate provider agent 113 to assess intent, providers, or other search result related data.

At block 704, the process 700 includes generating a workflow associated with the determined intent. For example, the alternative provider agent 113 may generate a workflow 138 that includes a number of mini-apps selected from a repository of mini-apps (e.g., 136). The mini-apps 136 may be provided by service providers 134. In a non-limiting example, FIG. 4 illustrates example search result 404 which represent a library page with a workflow 414. The workflow 414 includes four example mini-apps (e.g., mini-apps 416, 418, 420, and 422) from service provider 134, for example.

In the example of FIG. 4, the agent 113 may have determined that the user is a new student currently enrolled for yoga instruction at "GymIT." The agent 113 may have also determined that the user has previously used mini-app 414 to schedule classes and mini-app 416 to pay fees while taking classes as a student, but may have determined that the user has not paid fees as an instructor before. Therefore, the alternate provider agent 113 may have searched for additional one or more mini-apps to assist the user with a new task in a determined workflow. In addition, the alternate provider agent 113 may ascertain an ordered list of tasks (not shown), but included in data associated with the workflow of mini-apps. The ordered task list represents a determined flow for each task associated with each mini-app. In some implementations, the ordered task list is ordered based at least in part on stored aggregated user data associated with two or more of the plurality of mini-apps. For example, the ordered task list may generated using user provided account information, cookie data, or other aggregated user data (e.g., click-throughs, application access order, search queries, etc.).

In operation, the agent 113 may have found and provided mini-app 420 in the workflow 414 based on an understanding that a user typically schedules a class (e.g., using mini-app 416) and pays for a class (e.g., mini-app 418) before enrolling in instructor classes (e.g., using mini-app 420), which is why mini-app 420 is provided third in the ordered list of mini-apps for the workflow. The underling ordered task list may include a determined common order across many users to schedule and pay for a class with provider GymIT before enrolling in instructor classes for provider GymIT.

Thus, in some implementations, generating the workflow 414 associated with the determined intent may include selecting the mini-apps (e.g., 416-422) based at least in part on predicting at least two sequential tasks (e.g., register for class, pay for class, register for instructor class) for the ordered task list. Other rules and predictions may be used to determine task list order and thus mini-app order within a particular workflow.

In some implementations, generating the workflow 138 associated with the determined intent for the query includes selecting mini-apps based at least in part on determining which mini-apps in the repository of mini-apps 136 provide a service corresponding to another of the plurality of mini-apps in the repository. For example, if a user accesses a mini-app for a gym fees calculator, the alternate provider agent 113 may determine to provide a mini-app that depicts open gyms near to a determined location of the user.

By way of example, discovering at least one mini-app from a provider (e.g., search results for the user) may include the alternate provider agent 113 assessing the intent and comparing the intent with the intent library 118 to find alternate (e.g., alternative, different, non-overlapping, additional, etc.) service providers and/or alternate mini-apps that may be responsive to the same intent (e.g., offer similar or identical services e.g., via a mini-app, match keywords in the intent library 118, etc.). In some implementations, mini-apps are selected for the workflow based on predefined login credentials associated with a user entering the query. For example, if the user has an account with a first gym, the alternate provider agent 113 may offer access to similar mini-apps offered by other gyms near the user. Such offerings may inform the user of pricing, locations, hours, amenities, etc. for competing gyms in the area.

At block 706, the process 700 includes ranking the selected plurality of mini-apps according to the ordered task list. For example, the browser 128 may rank or otherwise organize workflow 414 so that each app listed in the set of apps on the library page search result 404 is provided to the user in a determined order based on the ordered task list. In some implementations, the browser 128 ranks the mini-apps in workflow 414 according to which service provider generated the respective mini-app. For example, mini-apps 416, 418, and 420 are listed together based on being provided by the "GymIT" entity. Additional mini-app 422 is listed next and another service provider's mini-app (e.g., mini-app 424) is provided after that. In some implementations, the ordered task list is used to rank the mini-apps according to task accomplishment as part of a predetermined workflow.

At block 708, the process 700 includes triggering rendering of search results, the search results including at least a first ranked mini-app in an expanded state and a remaining plurality of the mini-apps in a collapsed state. For example, the workflow 414 may alternatively be depicted similar to the mini-apps in FIG. 3C, where mini app 416 is expanded and mini-apps 418-422 are collapsed. In some implementations a library page 404 may be generated and triggered for rendering by the search engine 102 to depict at least a portion of the mini-apps in an expanded state, in response to receiving a view all request. In some implementations, the process 700 may include triggering rendering of a view more control that when selected ranks and populates additional mini-apps (e.g., from search results 406, 408, and/or 410, for example) for the workflow 414 if such mini-apps match the determined intent. The mini-apps may be provided in a collapsed state.

In some implementations, at least a portion of the ranked plurality of mini-apps are selected based on a determined lack of relationship between a user providing the query and the respective service provider of the respective ranked mini-app. For example, as shown in FIG. 4, mini-app 422 is part of the workflow 414, but is provided by a provider "NYYoga" that is determined to not be associated with the user nor an account of the user. The "GymIT" provider is determined to be related to the user because the user has previously accessed one of the provider's mini-apps. In some implementations, the "GymIT" provider may be determined to be related to the user because the user has an account with the provider.

FIG. 8 shows an example of a computer device 800, which may be operated as search engine 102 and/or client 170 of FIG. 1, which may be used with the techniques described here. Computing device 800 is intended to represent various example forms of computing devices, such as laptops, desktops, workstations, personal digital assistants, cellular telephones, smartphones, tablets, televisions, servers, and other computing devices, including wearable devices. The components shown here, their connections and relationships, and their functions, are meant to be examples only, and are not meant to limit implementations of the inventions described and/or claimed in this document.

Computing device 800 includes a processor 802, memory 804, a storage device 806, and expansion ports 810 connected via an interface 808. In some implementations, computing device 800 may include transceiver 846, communication interface 844, and a GPS (Global Positioning System) receiver module 848, among other components, such as a camera or cameras, touch sensors, keyboards, etc., connected via interface 808. Device 800 may communicate wirelessly through communication interface 844, which may include digital signal processing circuitry where necessary. Each of the components 802, 804, 806, 808, 810, 840, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 408 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, a camera or cameras, or a networking device such as a switch or router, e.g., through a network adapter.

The computing device 800 may be implemented in a number of different forms, as shown in the figure. For example, it may be implemented as a standard server 830, or multiple times in a group of such servers. It may also be implemented as part of a rack server system. In addition, it may be implemented in a computing device, such as a laptop computer 832, personal computer 834, or tablet/smart phone 836. An entire system may be made up of multiple computing devices 800 communicating with each other. Other configurations are possible.

FIG. 9 shows an example of a computer device 900, which may be search engine 102 of FIG. 1, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980a includes multiple racks 958a-958n. Each rack may include one or more processors, such as processors 952a-752n and 962a-762n. The processors may include data processors, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 900.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952a-752n. Data structures, such as an index, may be stored, for example, across storage 956 and memory 954. Computing device 900 may include other components not shown, such as controllers, buses, input/output devices, communications modules, etc.

An entire system may be made up of multiple computing devices 900 communicating with each other. For example, device 980a may communicate with devices 980b, 980c, and 980d, and these may collectively be known as search engine 102. As another example, search engine 102 of FIG. 1 may include two or more computing devices 900. Some of the computing devices may be located geographically close to each other, and others may be located geographically distant. The layout of system 900 is an example only and the system may take on other layouts or configurations. Implementations of the described techniques may include hardware, a method or process, or computer software on a computer-accessible medium.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving a query;
   determining, from an intent library including a plurality of intents, an intent that matches the query, at least some intents of the plurality of intents corresponding with a plurality of mini-apps from a plurality of providers;
   identifying, based on the determined intent, at least one mini-app from a first provider and at least one mini-app from a second provider;
   ranking the identified mini-apps;
   triggering rendering of search results, the search results including at least a first ranked mini-app in an expanded state and remaining ranked mini-apps in a collapsed state;
   receiving input in the first ranked mini-app; and
   receiving selection of another mini-app within the search results, the selection triggering:
   a collapsing of the first ranked mini-app;
   an expansion of the selected other mini-app; and
   populating the selected other mini-app with the received input from the first ranked mini-app mapped to at least one field in the selected other mini-app.

2. The method of claim 1, wherein the ranking of the identified mini-apps is based at least in part on determining an affiliation between a user providing the query and the first provider or the second provider.

3. The method of claim 2, wherein determining the affiliation of the user to the first provider or the second provider includes determining that the respective provider is provided as a search term in the query.

4. The method of claim 1, wherein determining the intent includes matching at least one keyword of the query to at least one intent in the intent library.

5. The method of claim 1, wherein a second ranked mini-app is selected based on a determined lack of relationship between a user providing the query and the first provider or the second provider.

6. The method of claim 1, further comprising:
   triggering rendering of a view more control that, when selected, ranks and populates additional mini-apps that match the determined intent, the additional mini-apps being in a collapsed state.

7. A system comprising:
   at least one intent library including a plurality of intents, at least some intents of the plurality of intents corresponding with a plurality of mini-apps from a plurality of providers;
   a repository of mini-app data corresponding with the plurality of mini-apps;
   at least one processing device; and
   memory storing instructions that when executed cause the at least one processing device to perform operations including:
   receiving a query;
   determining an intent from the at least one intent library that matches the received query;
   generate a workflow associated with the determined intent, the workflow comprising:
   a subset of the plurality of mini-apps selected from the repository of mini-app data; and
   an ordered task list;
   ranking the subset according to the ordered task list; and
   triggering rendering of search results, the search results including a first ranked mini-app of the subset in an expanded state and additional mini-apps of the subset in a collapsed state.

8. The system of claim 7, wherein the first ranked mini-app is selected based on the intent and a determination that a provider of the first ranked mini-app is associated with a user entering the query.

9. The system of claim 8, wherein determining the association of the provider to the user includes determining that the provider is a search term in the query.

10. The system of claim 8, wherein determining the association of the provider to the user includes determining that the user is logged into a user account associated with the provider.

11. The system of claim 7, wherein the operations further comprise:
    triggering rendering of a view more control that, when selected, ranks and populates other mini-apps that match the determined intent, the other mini-apps being in a collapsed state.

12. A non-transitory computer-readable medium comprising instructions stored thereon that, when executed by at least one processor, are configured to cause a computing system to at least:
- determine an intent from an intent library that matches at least a portion of a received query;
- generate a workflow associated with the determined intent, the workflow comprising:
  - a plurality of mini-apps selected from a repository of mini-apps, the plurality of mini-apps provided by service providers; and
  - an ordered task list;
- rank the plurality of mini-apps according to the ordered task list; and
- trigger rendering of search results, the search results including at least a first ranked mini-app of the plurality of mini-apps in an expanded state and remaining mini-apps of the plurality of mini-apps in a collapsed state.

13. The computer-readable medium of claim 12, wherein the instructions are further configured to cause the computing system to:
- generate and trigger rendering of a library page providing at least a portion of the plurality of mini-apps in an expanded state in response to receiving a view all request.

14. The computer-readable medium of claim 12, wherein the plurality of mini-apps are selected based on predefined login credentials associated with a user entering the received query.

15. The computer-readable medium of claim 12, wherein the ordered task list is ordered based at least in part on stored aggregated user data associated with two or more of the plurality of mini-apps.

16. The computer-readable medium of claim 12, wherein generating the workflow associated with the determined intent includes selecting the plurality of mini-apps based at least in part on predicting at least two sequential tasks for the ordered task list.

17. The computer-readable medium of claim 12, wherein generating the workflow associated with the determined intent includes selecting the plurality of mini-apps based at least in part on determining which mini-apps in the repository of mini-apps provide a service corresponding to another of the plurality of mini-apps in the repository.

18. The computer-readable medium of claim 12, wherein the instructions further comprise:
- triggering rendering of a view more control that, when selected, ranks and populates additional mini-apps for the workflow that match the determined intent, the additional mini-apps being in a collapsed state.

19. The computer-readable medium of claim 12, wherein at least a portion of the plurality of mini-apps are selected based on a determined lack of relationship between a user providing the received query and respective service providers of respective mini-apps of the portion of the plurality of mini-apps.

* * * * *

UNITED STATES PATENT AND TRADEMARK OFFICE
CERTIFICATE OF CORRECTION

| | | |
|---|---|---|
| PATENT NO. | : 11,461,419 B2 | |
| APPLICATION NO. | : 16/946851 | |
| DATED | : October 4, 2022 | |
| INVENTOR(S) | : Zimmerman et al. | |

It is certified that error appears in the above-identified patent and that said Letters Patent is hereby corrected as shown below:

In the Claims

In Column 30, Claim 7, Line 40, after "the" delete "received".

Signed and Sealed this
First Day of August, 2023

Katherine Kelly Vidal
*Director of the United States Patent and Trademark Office*